(12) United States Patent
Fimoff et al.

(10) Patent No.: US 6,687,310 B1
(45) Date of Patent: Feb. 3, 2004

(54) TRELLIS CODED MODULATION SYSTEM FOR DIGITAL TELEVISION SIGNAL WITH TRELLIS CODED DATA AND SYNCHRONIZATION SYMBOLS

(75) Inventors: Mark Fimoff, Hoffman Estates, IL (US); Richard W. Citta, Oak Park, IL (US); Wayne E. Bretl, Schaumburg, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/321,392

(22) Filed: May 27, 1999

(51) Int. Cl.[7] .................................................. H04L 5/12
(52) U.S. Cl. ...................................................... 375/265
(58) Field of Search ................................ 375/265, 298, 375/302, 268, 271

(56) References Cited

U.S. PATENT DOCUMENTS

| | | | |
|---|---|---|---|
| 4,312,070 A | * 1/1982 | Coombes et al. ........... 714/762 |
| 5,243,627 A | 9/1993 | Betts et al. |
| 5,600,677 A | 2/1997 | Citta et al. |
| 5,648,822 A | 7/1997 | Hulyalkar |
| 5,677,911 A | * 10/1997 | Fimoff et al. ................ 714/701 |
| 6,141,384 A | * 10/2000 | Wittig et al. ........... 375/240.25 |

OTHER PUBLICATIONS

S .Benedetto et al., *Parallel Concatenated Trellis Coded Modulation*, IEEE Trans. Inf. TH., (1996), pp. 974–978.

* cited by examiner

Primary Examiner—Stephen Chin
Assistant Examiner—Kevin Kim

(57) ABSTRACT

A transmitter transmits, and a receiver receives, a data frame is transmitted into an 8 MHZ channel. The data frame contains a plurality of data segments, where each of the data segments contain DS symbols. The DS symbols include data symbols, priming symbols, and segment synchronization symbols. The transmitter trellis encodes the data symbols, priming symbols, and segment synchronization symbols. The receiver trellis decodes the data symbols, priming symbols, and segment synchronization symbols. The data frame also contains a mode control ID which the receiver uses in trellis decoding the data symbols, priming symbols, and segment synchronization symbols.

40 Claims, 23 Drawing Sheets

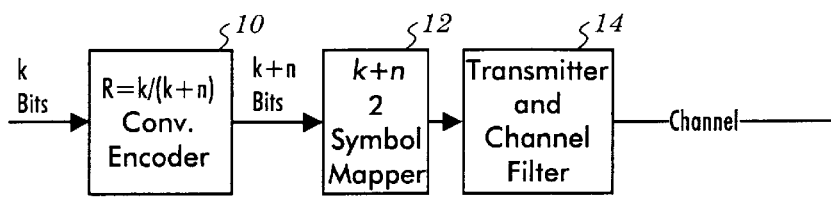
Fig. 1
Prior Art
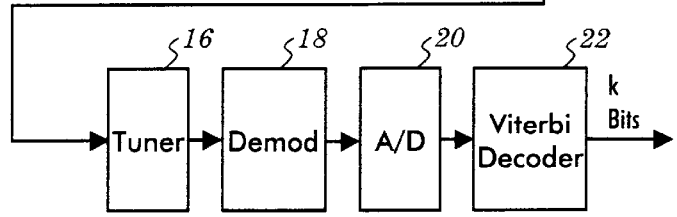
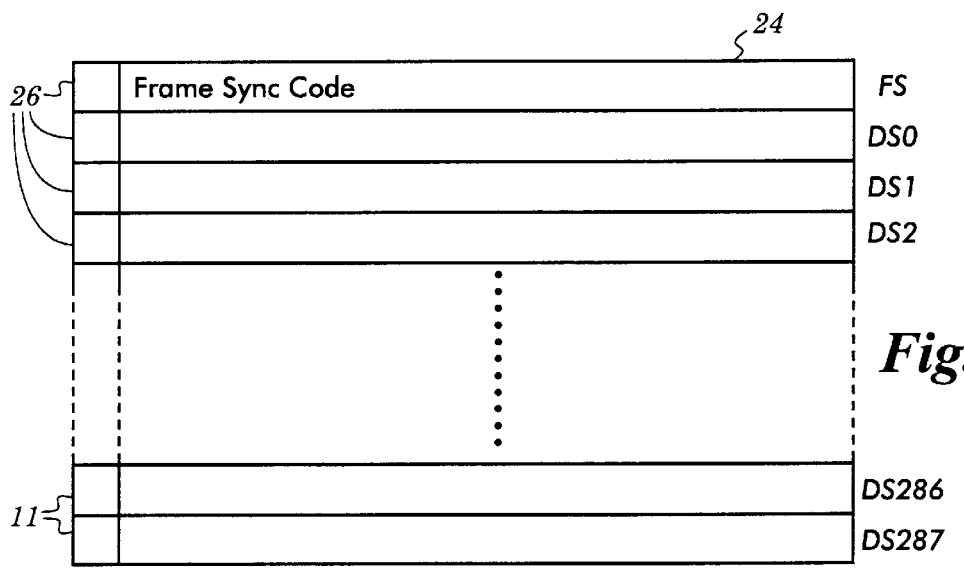
*Fig. 2A*
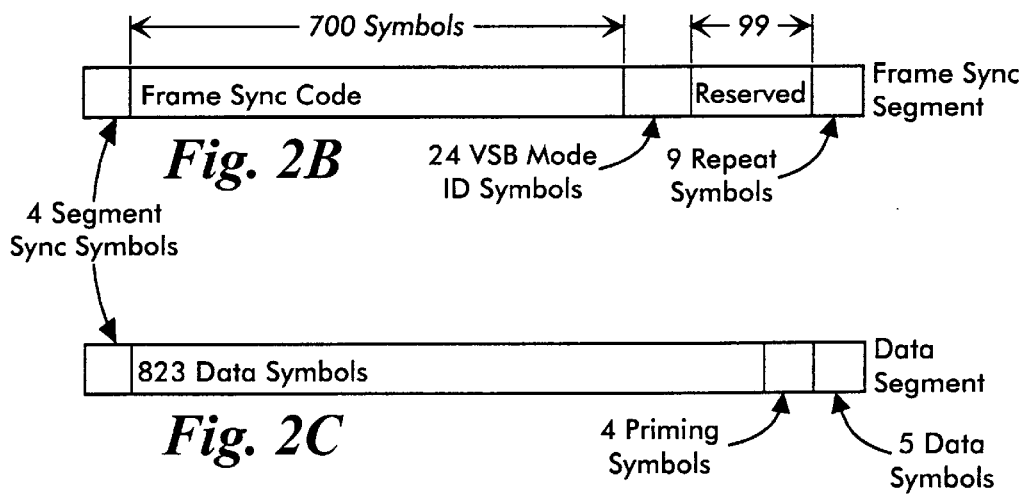
*Fig. 2B*
*Fig. 2C*

| VSB Mode | Data Symbols Per Frame | Bits Per Symbol | Data Bytes Per Frame | RS Blocks Per Frame | Interleave Groups Per Frame (B=54) |
|---|---|---|---|---|---|
| 16 | 238,464 | 4 | 119,232 | 576 | 2208 |
| 8 | 238,464 | 3 | 89,424 | 432 | 1656 |
| 4,8 VSBT | 238,464 | 2 | 59,616 | 288 | 1104 |
| 2 | 238,464 | 1 | 29,808 | 144 | 552 |

| Trellis Coded Symbols Per Frame | TCG's Per Frame |
|---|---|
| 288 X 836 = 240,768 | 240,768/9 = 26752 |

| Data Symbols Per Frame | DSIG's Per Frame |
|---|---|
| 288 X 828 = 238,464 | 238,464/36 = 6624 |

| VSB Mode M=16 | VSB Mode M=8, 8T | VSB Mode M=4 | VSB Mode M=2 |
|---|---|---|---|
| 1111  +120 | | | |
| | 111  +112 | | |
| 1110  +104 | | | |
| | | 11  +96 | |
| 1101  +88 | | | |
| | 110  +80 | | |
| 1100  +72 | | | |
| | | | 1  +64 |
| 1011  +56 | | | |
| | 101  +48 | | |
| 1010  +40 | | | |
| | | 10  +32 | |
| 1001  +24 | | | |
| | 100  +16 | | |
| 1000  +8 | | | |
| 0111  −8 | | | |
| | 011  −16 | | |
| 0110  −24 | | | |
| | | 01  −32 | |
| 0101  −40 | | | |
| | 010  −48 | | |
| 0100  −56 | | | |
| | | | 0  −64 |
| 0011  −72 | | | |
| | 001  −80 | | |
| 0010  −88 | | | |
| | | 00  −96 | |
| 0001  −104 | | | |
| | 000  −112 | | |
| 0000  −120 | | | |

*Fig. 4B*

Mapper Function

| Z2 | Z1 | Z0 | Level | Subset |
|----|----|----|-------|--------|
| 0  | 0  | 0  | -7    | d      |
| 0  | 0  | 1  | -5    | c      |
| 0  | 1  | 0  | -3    | b      |
| 0  | 1  | 1  | -1    | a      |
| 1  | 0  | 0  | +1    | d      |
| 1  | 0  | 1  | +3    | c      |
| 1  | 1  | 0  | +5    | b      |
| 1  | 1  | 1  | +7    | a      |

State = [$Q_2Q_1Q_0$], Branch Label: $X_2X_1$ (Uncoded Input Symbol)/TCM Coded Output Symbol TCM Encoder State Diagram Table 1. Symbol Occpancy of Convolutional Encoders

Start Seg 0                                                                  End Seg 0, Start Seg 1

| | | | | | | | | | | | | | | | |
|---|---|---|---|---|---|---|---|---|---|---|---|---|---|---|---|
| $S_0$ | $5_0$ | $5_1$ | $5_2$ | $5_3$ | $14_0$ | $14_1$ | $14_2$ | $14_3$ | $194_3$ | $203_0$ | $203_1$ | $203_2$ | $P_1$ | $S_1$ | $6_0$ |
| $S_1$ | $6_0$ | $6_1$ | $6_2$ | $6_3$ | $15_0$ | $15_1$ | $15_2$ | $15_3$ | $195_3$ | $204_0$ | $204_1$ | $204_2$ | $P_2$ | $S_2$ | $7_0$ |
| $S_2$ | $7_0$ | $7_1$ | $7_2$ | $7_3$ | $16_0$ | $16_1$ | $16_2$ | $16_3$ | $196_3$ | $205_0$ | $205_1$ | $205_2$ | $P_3$ | $S_3$ | $8_0$ |
| $S_3$ | $8_0$ | $8_1$ | $8_2$ | $8_3$ | $17_0$ | $17_1$ | $17_2$ | $17_3$ | $197_3$ | $206_0$ | $206_1$ | $206_2$ | $202_3$ | $0_0$ | $0_1$ |
| $0_0$ | $0_1$ | $0_2$ | $0_3$ | $9_0$ | $9_1$ | $9_2$ | $9_3$ | $18_0$ ••• | $198_0$ | $198_1$ | $198_2$ | $198_3$ | $203_3$ | $1_0$ | $1_1$ ••• |
| $1_0$ | $1_1$ | $1_2$ | $1_3$ | $10_0$ | $10_1$ | $10_2$ | $10_3$ | $19_0$ | $199_0$ | $199_1$ | $199_2$ | $199_3$ | $204_3$ | $2_0$ | $2_1$ |
| $2_0$ | $2_1$ | $2_2$ | $2_3$ | $11_0$ | $11_1$ | $11_2$ | $11_3$ | $20_0$ | $200_0$ | $200_1$ | $200_2$ | $200_3$ | $205_3$ | $3_0$ | $3_1$ |
| $3_0$ | $3_1$ | $3_2$ | $3_3$ | $12_0$ | $12_1$ | $12_2$ | $12_3$ | $21_0$ | $201_0$ | $201_1$ | $201_2$ | $201_3$ | $206_3$ | $4_0$ | $4_1$ |
| $4_0$ | $4_1$ | $4_2$ | $4_3$ | $13_0$ | $13_1$ | $13_2$ | $13_3$ | $22_0$ | $202_0$ | $202_1$ | $202_2$ | $P_0$ | $S_0$ | $5_0$ | $5_1$ |

| End Seg 1, Start Seg 2 | | | | End Seg 2, Start Seg 3 | | | | End Seg 3, Start Seg 4 | | | |
|---|---|---|---|---|---|---|---|---|---|---|---|
| $204_2$ | $P_2$ | $S_2$ | $7_0$ | $205_1$ | $205_2$ | $P_3$ | $S_3$ | $206_0$ | $206_1$ | $206_2$ | $202_3$ |
| $205_2$ | $P_3$ | $S_3$ | $8_0$ | $206_1$ | $206_2$ | $202_3$ | $0_0$ | $198_1$ | $198_2$ | $198_3$ | $203_3$ |
| $206_2$ | $202_3$ | $0_0$ | $0_1$ | $198_2$ | $198_3$ | $203_3$ | $1_0$ | $199_1$ | $199_2$ | $199_3$ | $204_3$ |
| $198_3$ | $203_3$ | $1_0$ | $1_1$ | $199_2$ | $199_3$ | $204_3$ | $2_0$ | $200_1$ | $200_2$ | $200_3$ | $205_3$ |
| $199_3$ | $204_3$ | $2_0$ | $2_1$ ••• | $200_2$ | $200_3$ | $205_3$ | $3_0$ ••• | $201_1$ | $201_2$ | $201_3$ | $206_3$ ••• |
| $200_3$ | $205_3$ | $3_0$ | $3_1$ | $201_2$ | $201_3$ | $206_3$ | $4_0$ | $202_1$ | $202_2$ | $P_0$ | $S_0$ |
| $201_3$ | $206_3$ | $4_0$ | $4_1$ | $202_2$ | $P_0$ | $S_0$ | $5_0$ | $203_1$ | $203_2$ | $P_1$ | $S_1$ |
| $P_0$ | $S_0$ | $5_0$ | $5_1$ | $203_2$ | $P_1$ | $S_1$ | $6_0$ | $204_1$ | $204_2$ | $P_2$ | $S_2$ |
| $P_1$ | $S_1$ | $6_0$ | $6_1$ | $204_2$ | $P_2$ | $S_2$ | $7_0$ | $205_1$ | $205_2$ | $P_3$ | $S_3$ |

| End Seg 4, Start Seg 5 | | | | End Seg 5, Start Seg 6 | | | | End Seg 6, Start Seg 7 | | | |
|---|---|---|---|---|---|---|---|---|---|---|---|
| $198_2$ | $198_3$ | $203_3$ | $1_0$ | $199_2$ | $199_3$ | $204_3$ | $2_0$ | $200_2$ | $200_3$ | $205_3$ | $3_0$ |
| $199_2$ | $199_3$ | $204_3$ | $2_0$ | $200_2$ | $200_3$ | $205_3$ | $3_0$ | $201_2$ | $201_3$ | $206_3$ | $4_0$ |
| $200_2$ | $200_3$ | $205_3$ | $3_0$ | $201_2$ | $201_3$ | $206_3$ | $4_0$ | $202_2$ | $P_0$ | $S_0$ | $5_0$ |
| $201_2$ | $201_3$ | $206_3$ | $4_0$ | $202_2$ | $P_0$ | $S_0$ | $5_0$ | $203_2$ | $P_1$ | $S_1$ | $6_0$ |
| $202_2$ | $P_0$ | $S_0$ | $5_0$ ••• | $203_2$ | $P_1$ | $S_1$ | $6_0$ ••• | $204_2$ | $P_2$ | $S_2$ | $7_0$ ••• |
| $203_2$ | $P_1$ | $S_1$ | $6_0$ | $204_2$ | $P_2$ | $S_2$ | $7_0$ | $205_2$ | $P_3$ | $S_3$ | $8_0$ |
| $204_2$ | $P_2$ | $S_2$ | $7_0$ | $205_2$ | $P_3$ | $S_3$ | $8_0$ | $206_2$ | $202_3$ | $0_0$ | $0_1$ |
| $205_2$ | $P_3$ | $S_3$ | $8_0$ | $206_2$ | $202_3$ | $0_0$ | $0_1$ | $198_3$ | $203_3$ | $1_0$ | $1_1$ |
| $206_2$ | $202_3$ | $0_0$ | $0_1$ | $198_3$ | $203_3$ | $1_0$ | $1_1$ | $199_3$ | $204_3$ | $2_0$ | $2_1$ |

| End Seg 7, Start Seg 8 | | | | End Seg 8, Start Seg 9/0 | | | | | | | |
|---|---|---|---|---|---|---|---|---|---|---|---|
| $201_1$ | $201_2$ | $201_3$ | $206_3$ | $202_0$ | $202_1$ | $202_2$ | $P_0$ | $S_0$ | $5_0$ | $5_1$ | $5_2$ |
| $202_1$ | $202_2$ | $P_0$ | $S_0$ | $203_0$ | $203_1$ | $203_2$ | $P_1$ | $S_1$ | $6_0$ | $6_1$ | $6_2$ |
| $203_1$ | $203_2$ | $P_1$ | $S_1$ | $204_0$ | $204_1$ | $204_2$ | $P_2$ | $S_2$ | $7_0$ | $7_1$ | $7_2$ |
| $204_1$ | $204_2$ | $P_2$ | $S_2$ | $205_0$ | $205_1$ | $205_2$ | $P_3$ | $S_3$ | $8_0$ | $8_1$ | $8_2$ |
| $205_1$ | $205_2$ | $P_3$ | $S_3$ ••• | $206_0$ | $206_1$ | $206_2$ | $202_3$ | $0_0$ | $0_1$ | $0_2$ | $0_3$ ••• |
| $206_1$ | $206_2$ | $202_3$ | $0_0$ | $198_1$ | $198_2$ | $198_3$ | $203_3$ | $1_0$ | $1_1$ | $1_2$ | $1_3$ |
| $198_2$ | $198_3$ | $203_3$ | $1_0$ | $199_1$ | $199_2$ | $199_3$ | $204_3$ | $2_0$ | $2_1$ | $2_2$ | $2_3$ |
| $199_2$ | $199_3$ | $204_3$ | $2_0$ | $200_1$ | $200_2$ | $200_3$ | $205_3$ | $3_0$ | $3_1$ | $3_2$ | $3_3$ |
| $200_2$ | $200_3$ | $205_3$ | $3_0$ | $201_1$ | $201_2$ | $201_3$ | $206_3$ | $4_0$ | $4_1$ | $4_2$ | $4_3$ |

*Fig. 23*

| $Q_1 Q_0$ (n) | $Y_2 Y_1$ (n) | $Z_2 Z_1 Z_0$ (n) | Level (n) | $Q_1 Q_0$ (n+1) | $Y_1 Y_0$ (n+1) |
|---|---|---|---|---|---|
| 0 0 | 0 0 | 0 0 0 | -7 | 0 0 | 0 0 |
| 0 0 | 0 1 | 0 1 0 | -3 | 0 1 | 1 0 |
| 0 0 | 1 0 | 1 0 0 | +1 | 0 0 | 0 0 |
| 0 0 | 1 1 | 1 1 0 | +5 | 0 1 | 1 0 |
| 0 1 | 0 0 | 0 0 1 | -5 | 1 0 | 0 1 |
| 0 1 | 0 1 | 0 1 1 | -1 | 1 1 | 1 1 |
| 0 1 | 1 0 | 1 0 1 | +3 | 1 0 | 0 1 |
| 0 1 | 1 1 | 1 1 1 | +7 | 1 1 | 1 1 |
| 1 0 | 0 0 | 0 0 0 | -7 | 0 1 | 0 0 |
| 1 0 | 0 1 | 0 1 0 | -3 | 0 0 | 1 0 |
| 1 0 | 1 0 | 1 0 0 | +1 | 0 1 | 0 0 |
| 1 0 | 1 1 | 1 1 0 | +5 | 0 0 | 1 0 |
| 1 1 | 0 0 | 0 0 1 | -5 | 1 1 | 0 1 |
| 1 1 | 0 1 | 0 1 1 | -1 | 1 0 | 1 1 |
| 1 1 | 1 0 | 1 0 1 | +3 | 1 1 | 0 1 |
| 1 1 | 1 1 | 1 1 1 | +7 | 1 0 | 1 1 |

| $Q_1Q_0Y_1Y_0$ (n) | Y Subset | $X_1$ (n) | $Z_1Z_0$ (n) | Z Subset | U(n) Subset Sum | Coset | $Q_1Q_0Y_1Y_0$ (n+1) |
|---|---|---|---|---|---|---|---|
| 0 0 0 0 | d | 0 | 0 0 | d | (d+d) | D1 | 0 0 0 0 |
| 0 0 0 0 | d | 1 | 1 0 | b | (b+d) | B1 | 0 1 1 0 |
| 0 0 1 0 | b | 0 | 0 0 | d | (d+b) | B1 | 0 0 0 0 |
| 0 0 1 0 | b | 1 | 1 0 | b | (b+b) | D2 | 0 1 1 0 |
| 0 1 0 0 | d | 0 | 0 1 | c | (c+d) | C1 | 1 0 0 1 |
| 0 1 0 0 | d | 1 | 1 1 | a | (a+d) | A | 1 1 1 1 |
| 0 1 1 0 | b | 0 | 0 1 | c | (c+b) | A | 1 0 0 1 |
| 0 1 1 0 | b | 1 | 1 1 | a | (a+b) | C2 | 1 1 1 1 |
| 1 0 0 1 | c | 0 | 0 0 | d | (d+c) | C1 | 0 1 0 0 |
| 1 0 0 1 | c | 1 | 1 0 | b | (b+c) | A | 0 0 1 0 |
| 1 0 1 1 | a | 0 | 0 0 | d | (d+a) | A | 0 1 0 0 |
| 1 0 1 1 | a | 1 | 1 0 | b | (b+a) | C2 | 0 0 1 0 |
| 1 1 0 1 | c | 0 | 0 1 | c | (c+c) | B1 | 1 1 0 1 |
| 1 1 0 1 | c | 1 | 1 1 | a | (a+c) | D2 | 1 0 1 1 |
| 1 1 1 1 | a | 0 | 0 1 | c | (c+a) | D2 | 1 1 0 1 |
| 1 1 1 1 | a | 1 | 1 1 | a | (a+a) | B2 | 1 0 1 1 |

Fig. 33

TRELLIS CODED MODULATION SYSTEM FOR DIGITAL TELEVISION SIGNAL WITH TRELLIS CODED DATA AND SYNCHRONIZATION SYMBOLS

RELATED PATENT APPLICATIONS

The following copending applications disclose subject matter claimed herein: (1) Ser. No. 09/321,462 filed on May 27, 1999 entitled Viterbi Decoder For A Positive Comb Filtered Digital Television Signal now U.S. Pat. No. 6,493,558; (2) entitled Mode Identification for a Digital Signal Having Multiple Data Constellations Subject to Interference now U.S. Pat. No. 6,493,402; (3) entitled Digital Television System For Reducing Co-Channel Interference in 8 MHZ Channels; and, (4) U.S. Pat. No. 6,608,870 entitled Data Frame for 8 MHZ Channels.

BACKGROUND OF THE INVENTION AND PRIOR ART

The present invention relates generally to digital transmission and reception systems and particularly to a digital data transmission and reception system having a data frame structure and circuit arrangement selected to facilitate operations such as symbol to byte and byte to symbol conversion, interleaving and deinterleaving, and forward error correction. The system also facilitates the use of a data rate that is related to the signal to noise ratio (S/N ratio) of the transmission environment for enhancing system capacity.

The present invention also relates to the use of trellis coded modulation (TCM) in transmission and reception systems and particularly concerns the use of TCM in high definition television (HDTV) applications.

U.S. Pat. Nos. 5,087,975 and 5,600,677 disclose a vestigial sideband (VSB) system for transmitting a television signal in the form of successive M-level symbols over a standard 6 MHZ television channel. The television signal may, for example, comprise one or two compressed wideband HDTV signals or a number of compressed lower resolution signals. While the number of levels, M, characterizing the symbols may vary depending on circumstances, the symbol rate is preferably fixed, such as at 10.76 Megasymbols/sec. The number of symbol levels used in any particular situation is largely a function of the S/N ratio characterizing the transmission medium. For example, where the S/N ratio is low, a smaller number of symbol levels may be used. It is believed that the ability to accommodate symbol levels of 16, 8, 8 with trellis coding (8 VSBT), 4, and 2 provides adequate flexibility to satisfy conditions in most systems. It will be appreciated that lower values of M can provide improved S/N ratio performance at the expense of reduced transmission bit rate. For example, assuming a rate of 10.76 Megasymbol/sec, a 2-level VSB signal (1 bit per symbol) provides a transmission bit rate of 10.76 Megabits/sec, a 4-level VSB signal (2 bits per symbol) provides a transmission bit rate of 21.52 Megabits/sec, and so on up to a 16-level VSB signal which provides a transmission bit rate of about 43.04 Megabits/sec.

It is generally known that the S/N ratio performance of cable television plants decreases as the signal (channel) frequency increases. The foregoing attribute of an M-level VSB transmission system, i.e., improved S/N ratio performance as M decreases, is used in one aspect of the invention to compensate for the S/N ratio degradation in the higher frequency channels of CATV distribution plants. That is, according to this aspect of the invention, VSB transmission is effected in a CATV system wherein the lower frequency channels are transmitted using larger values of M. While the bit rate of the higher frequency channels is thereby reduced, the received signal may be reproduced with a S/N ratio comparable to that of the lower frequency channels.

It is also generally known that the S/N performance of digital signals broadcast over the air may be improved by TCM (trellis coded modulation). U.S. Pat. Nos. 5,600,677 and 5,583,889 describe an 8 level TCM coded VSB signal. A Viterbi decoder in the receiver is used in close cooperation with a comb filter (disclosed in U.S. Pat. No. 5,087,975). The comb filter rejects co-channel interference caused by existing NTSC signals.

Moreover, in accordance with other aspects of the invention, system efficiency, particularly in relation to such operations as data interleaving and deinterleaving, symbol to byte and byte to symbol conversion, forward error correction, and Viterbi decoding, may be greatly enhanced by selecting a data frame structure which facilitates these operations within the constraints of the variable M-level VSB character and TCM coding parameters of the transmitted signal. U.S. Pat. No. 5,677,911 discloses a data frame structure for a 6 MHZ channel.

This application and the other copending applications described above adapt the previously disclosed VSB system so that it can be transmitted over standard 8 MHZ television channels (as used in China and Europe) with the ability to reject interference caused by existing PAL signals. In this system the symbol rate is preferably 14.14 Megasymbols/sec so that all bit rates increase proportionately.

Trellis coded modulation is a well known technique for improving the performance of digital transmission and reception systems. For example, improvements can be achieved in signal to noise (S/N) performance at a given power level; alternatively, the transmitted power required to achieve a given S/N performance can be reduced. In essence, TCM comprises the use of a multi-state convolutional encoder to convert each k input data bits of an input sequence of data bits into k+n output bits, and is therefore referred to as a rate k/(k+n) convolutional encoder. The output bits from the convolutional encoder are then mapped into discrete symbols (having $2^{(k+n)}$ values) of a modulated carrier for data transmission. The symbols may, for example, comprise $2^{(k+n)}$ phase or amplitude values. By encoding the input data bits in a state-dependent sequential manner, increased minimum Euclidean distances between the allowable transmitted sequences may be achieved leading to a reduced error probability when a maximum likelihood decoder (e.g., a Viterbi decoder) is used in the receiver.

FIG. 1 generally illustrates a system of the type described above. Each k bits of an input data stream is converted to k+n output bits by a rate k/(k+n) state-dependent sequential convolutional encoder 10. Each group of (k+n) output bits is then mapped by a mapper 12 to a symbol having a corresponding one of $2^{(k+n)}$ levels. The symbols are transmitted over a selected channel by a transmitter 14. A receiver includes a tuner 16 for converting the signal received over the selected channel to an intermediate frequency signal, which is demodulated by a demodulator 18 to provide a baseband analog signal. The analog signal is appropriately sampled by an analog to digital converter (A/D) 20 in order to recover the transmitted symbols which are then applied to a Viterbi decoder 22 for recovering the original k data bits.

U.S. Pat. No. 5,087,975 also discloses the use of a receiver comb filter having a subtracting element and a feed forward delay of twelve symbol clock intervals for reducing NTSC co-channel interference in the receiver. In order to facilitate operation of the receiver comb filter, the source data is precoded by a modulo-filter having a feedback delay of twelve symbol clock intervals. (In the absence of significant NTSC co-channel interference, the receiver of the patented system may include a complementary modulo postcoder which is used to process the received signal in lieu of the comb filter in order to avoid the degradation of S/N performance attributable thereto.) A system using TCM and the above comb filter is disclosed in the ATSC digital television standard published on Sep. 16, 1995 and in U.S. Pat. Nos. 5,600,677 and 5,583,889.

In a system using TCM and a comb filter, each pair of input data bits is supplied to a precoder and trellis encoder. One of the bits in each pair of bits is supplied to the precoder, and the other of the bits in each pair of bits is supplied to the trellis encoder. The precoder and trellis encoder each incorporates one or more twelve bit delay elements. Thus, the precoder and trellis encoder may be envisioned as twelve identical precoders and trellis encoders with (i) an input commutator (i.e., demultiplexer) for sequentially connecting input sets of two bits to the twelve identical precoders and trellis encoders and (ii) an output commutator (i.e., multiplexer) for sequentially connecting output sets of three bits to a symbol mapper.

The twelve precoders and trellis encoders interleave the bit pairs so that each bit pair in a first byte of data is processed by a first precoder and trellis encoder, so that each bit pair in a second byte of data is processed by a second precoder and trellis encoder, ... and so that each bit pair in a twelfth byte of data is processed by a twelfth precoder and trellis encoder. Each subsequent sets of twelve bytes are similarly processed. The symbol mapper maps each set of three output bits to a symbol having a corresponding one of eight signal levels of an eight-level constellation. The resulting symbols are supplied to a multiplexer which adds synchronization symbols to the data symbols in order to structure the data and synchronization symbols in a frame.

A frame for a 6 MHZ channel is structured so that it has 313 segments. The first segment of a frame (a frame sync segment) includes (i) a segment sync portion containing four segment sync symbols and (ii) a field sync portion containing 828 pseudo-randomly generated field sync symbols. Each of the other 312 segments (data segments) includes (i) a segment sync portion containing four segment sync symbols and (ii) a data portion containing 828 symbols of data.

Thereafter, the symbols in the above described frame structure are transmitted, and are received by a receiver. The receiver includes the comb filter and a trellis decoder. The comb filter is present in order to filter out interference which may be caused by NTSC channels broadcast by nearby stations. The trellis decoder (such as a Viterbi decoder) is present in order to decode the symbols in the received frames into their corresponding original bit pairs. The trellis decoder is similar to the trellis encoder in that the trellis decoder processes the symbols of the same byte together. Thus, these symbols must enter the trellis decoder in the correct sequence.

The present application and the other copending applications mentioned above relate to a modification of the above 6 MHZ VSB system so that it will operate over standard 8 MHZ television channels and have the ability to reduce PAL co-channel interference. In the system of the present application, the symbol rate is preferably fixed at about 14.14 MHZ (instead of 10.76 MHZ). Also a nine way (instead of a twelve way) trellis encoding process is utilized, and the data frame consists of 289 segments (instead of 313 segments). Both the prior disclosed VSB system and the VSB system disclosed in the present application utilize multiple modes, which are described in Part I below, and in U.S. Pat. No. 5,677,911.

BRIEF DESCRIPTION OF THE DRAWINGS

The features and advantages of the present invention will be apparent upon reading the following description in conjunction with the drawings, in which:

FIG. 1 is a system block diagram of a conventional TCM system employing an optimal maximum likelihood sequence estimation (MLSE) Viterbi decoder;

FIG. 2A illustrates the novel data frame structure of the invention;

FIG. 2B illustrates the structure of the frame synchronization (FS) segment of the data frame of FIG. 2A;

FIG. 2C illustrates the structure of a data segment of the data frame of FIG. 2A;

FIG. 4B is a chart illustrating an implementation of the byte to symbol converter portion of the byte to symbol converter and mapper 36 of the transmitter of FIG. 4A;

FIG. 19 illustrates the mapping function of the symbol mapper 122 of FIG. 15a;

FIG. 20 is a state transition diagram for the convolutional encoder of FIG. 17;

FIG. 23 is a table showing the symbol occupancy of the nine convolutional encoders of FIG. 16;

FIG. 33 shows the resultant effect of combining two subsets in the comb filter 132 and the resultant cosets that arise;

DESCRIPTION OF THE PREFERRED EMBODIMENT

Figures 3A, 3B, 4A:
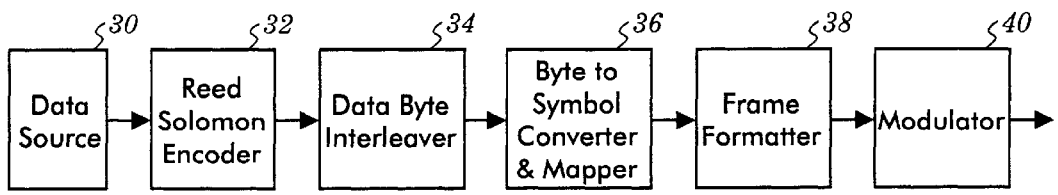
FIG. 3A is a chart showing the relationship of data constellation size to the other parameters of the invention.
FIG. 3B is a chart showing the relationship of TCM coding parameters to other parameters of the invention.
FIG. 4A is a simplified block diagram of a transmitter in accordance with the invention.

The following description consists of two main parts, Part I and Part II. Part I discusses a novel data frame structure. It also discusses a transmitter and receiver operation for all VSB modes (non-TCM coded and TCM coded) with reference to the TCM coding in only enough detail as needed to explain the data frame structure. Part II discusses a novel TCM coded mode and associated transmitter and receiver operation in detail.

Part I

The structure of the novel data frame of the invention is illustrated in FIG. 2A. The data frame, generally identified by reference numeral 24, comprises 289 segments. All segments contain 836 symbols.

As shown in FIGS. 2A and 2B, the first segment of the data frame 24, which is identified as FS (frame synchronization), begins with a four symbol segment synchronization character 26, where each of the four symbols is a two level symbol. This character may be of the form disclosed in U.S. Pat. No. 5,416,524. The next 823 symbols of the frame synchronization segment are also two level symbols and they include 700 symbols forming a pseudo random sequence frame synchronization code, 24 symbols for VSB mode identification that identifies the level M (e.g., 16, 8, 8T, 4, or 2) for the data and priming symbols (defined later in Part II) of the remaining 288 segments of the data frame 24, and reserved space for 99 symbols. The pseudo random sequence frame synchronization code is disclosed in the ATSC Digital Television Standard and in U.S. Pat. No. 5,619,269. (It should be noted that this patent discloses the use of three pseudo random sequences in the field sync signal as well as a 24 symbol VSB mode identification signal.) VSB mode identification is disclosed below. The last nine symbols of the FS segment are repeats of the last nine symbols of the last segment of the preceding frame, as discussed later in Part II.

The remaining 288 segments of the data frame 24 are data segments identified as DS0–DS287. As shown in FIG. 2C, a data segment begins with the same two level, four symbol segment synchronization character 26 as is used in the FS segment. This segment synchronization character is followed by 832 symbols consisting of 828 data symbols and four priming symbols. The four priming symbols assume a form discussed later in Part II.

As shown by the table of FIG. 3A, each data symbol of a data segment DS0–DS287 represents either 4 bits (M=16), 3 bits (M=8), 2 bits (M=4 or 8T), or 1 bit (M=2). Because there are a fixed number of data symbols per frame (288× 828=238,464), the number of data bytes per frame will vary as shown. That is, each data frame 24 comprises 119,232 data bytes for VSB mode M=16; 89,424 data bytes for VSB mode M=8; 59,616 data bytes for VSB mode M=4 or 8T; and, 29,808 data bytes for VSB mode M=2. However, while the number of data bytes per frame varies depending on the VSB mode M, it will be observed that, for any particular value of M (16, 8, 8T, 4 or 2), an integral number of bytes is provided in each data frame 24. This characteristic of the structure of the data frame 24 substantially simplifies the design of a receiver. As will be explained in further detail hereinafter, the receiver forward error correction circuitry, the receiver symbol to byte converter, and the receiver byte deinterleaver are preferably frame synchronized with the transmitted signal for all VSB modes, and the receiver Viterbi decoder and the data symbol deinterleaver are preferably frame synchronized for the 8 VSBT mode. The frame synchronization signal can be directly used for these purposes so long as there are an integral number of bytes, forward error correction blocks, and byte interleave groups in each data frame 24 for each of the VSB modes, and so long as there are an integral number of TCM coded groups (TCGs), which are defined below, and data symbol interleave groups (DSIGs), which are also defined below, in each data frame for the 8 VSBT mode.

Reed-Solomon (RS) forward error correction is used in the receiver of the invention. A standard transport packet size of 188 bytes has been established by the MPEG (Motion Picture Experts Group) committee. This packet may be reduced to 187 bytes by removing the MPEG synchronization byte due to the presence of the segment synchronization character 26. Adding 20 parity bytes to each such 187 byte transport packet results in an RS block size of 207 bytes, allowing for the correction of ten byte errors per RS block. As seen in FIG. 3A, an RS block size of 207 bytes advantageously results in an integral number of RS blocks per frame for all of the selected VSB modes, thereby allowing the receiver's RS decoder to be synchronized by the frame synchronization signal.

A convolutional byte interleave group size (B) is defined according to the invention as comprising B=54 data bytes (other values for B may be used) which also results in an integral number of byte interleave groups per frame regardless of the selected VSB mode, as shown in FIG. 3A. This convolutional byte interleave group size also allows the frame synchronization signal to be used to periodically synchronize the receiver deinterleaver, thereby simplifying receiver design.

With respect to the 8 VSBT mode and FIG. 3B, and as explained below in Part II, nine symbols at a time are convolutionally coded in parallel by nine separate convolutional encoders. These nine symbols may be called a TCM coded group (TCG). All 836 symbols (segment sync, data, and priming symbols) in each of the 288 data segments are TCM coded. Therefore, it can be seen from the following equation that there are an integral number of TCG's in the data frame 24:

$$\frac{(288 \text{ data segments per frame})(836 \text{ symbols per data segment})}{9 \text{ symbols per TCG}} = 26,752 \text{ TCGs per frame.}$$

This integral number of TCGs allows the frame synchronization signal to be used to periodically synchronize the Viterbi decoding process in the receiver.

Furthermore, with respect to the 8 VSBT mode, and as explained later in Part II, it is advantageous for data symbols associated with the same byte to be processed by the same one of the nine TCM encoders. This processing can be achieved for most symbols by using a 9×4 data symbol interleaver operating over 36 data symbols defined as a data symbol interleave group, DSIG. It is noted that only data symbols are interleaved in this manner. Priming and segment synchronization symbols are not included in this symbol interleaving. Accordingly, there are an integral number of DSIGs per data segment (828/36=23). Therefore, there are an integral number of DSIGs per frame:

(828/36 DSIGs per data segment)×(288 data segments per frame)= 6624 DSIGs per frame.

This integral number of DSIGs allows the frame synchronization signal to be used to periodically synchronize the symbol deinterleaver in the receiver.

FIG. 4A is a simplified block diagram of a transmitter constructed in accordance with the invention. A data source 30 of television signals is coupled to a Reed-Solomon encoder 32 which feeds a convolutional data byte interleaver 34 which, in turn, supplies interleaved data bytes to a byte to symbol converter and mapper 36. It will be appreciated that the data source 30 may supply a compressed HDTV signal (or two compressed HDTV signals depending on the VSB mode) or a number of compressed standard definition signals. The symbol output of the byte to symbol converter and mapper 36 is supplied to a frame formatter 38 which is controlled, along with the byte to symbol converter and mapper 36, by a VSB mode control signal. The formatted frames, which conform to the arrangement previously described in connection with FIGS. 2 and 3, are supplied to a VSB modulator 40 for transmission over an 8 MHZ television channel. The transmission medium may comprise a cable television plant or a terrestrial broadcast environment. In either case, one such transmitter is required for each transmitted 8 MHZ channel.

The byte to symbol converter and mapper 36 has two modes of operation: one for the non-TCM modes, and another for 8 VSBT. A mode chart is shown in FIG. 4B. For the non-TCM modes, the chart comprises four columns, one for each of the VSB modes M=16, M=8, M=4 and M=2. The byte to symbol converter and mapper 36 is operative in response to the applied VSB mode control signal for converting the input data bytes to output data symbols according to the appropriate column of the chart of FIG. 4B. For example, for VSB mode M=16, the input data byte 11010101 would be converted to two successive data symbols having corresponding relative amplitudes of +88 and −40. For VSB mode M=8, this input data byte would be converted to three successive data symbols having corresponding relative amplitudes of +80, +48 and −16 (assuming the first bit of the next data byte is 1) or +80, +48 and −48 (assuming the first bit of the next data byte is 0). For VSB mode M=4, this data byte would be converted to four successive symbols having corresponding relative amplitudes of +96, −32, −32 and −32. For VSB mode M=2, eight output symbols would be provided at relative amplitudes +64, +64, −64, +64, −64, +64, −64 and +64. For VSB mode M=8T, the data byte would be converted to four successive 8 level symbols in a complex manner described in detail later in Part II and now briefly in connection with FIGS. 5 and 6.

Figure 5:
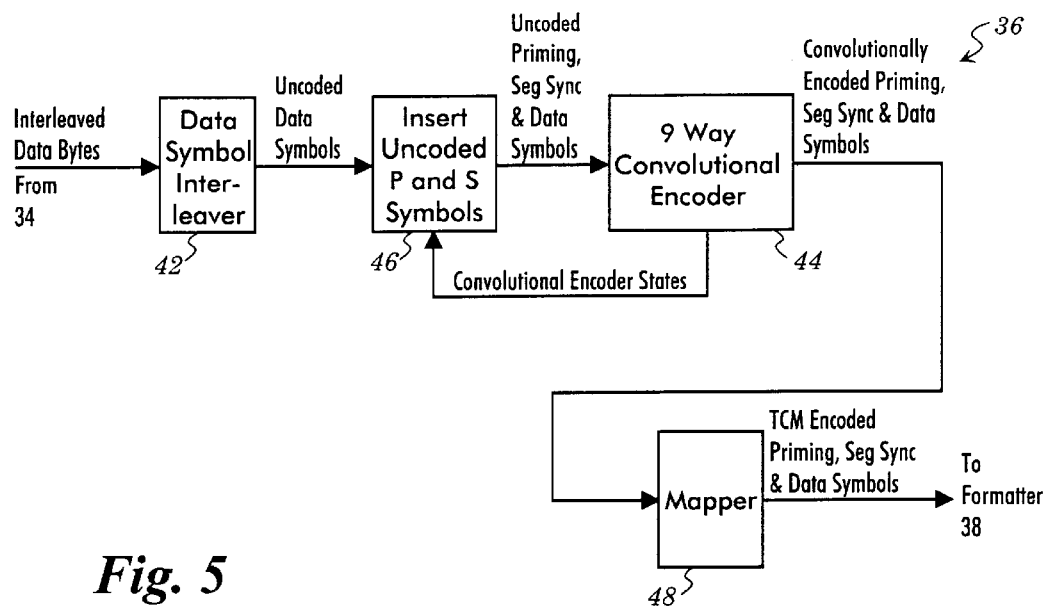
FIG. 5 shows the operation of the byte to symbol converter and mapper of FIG. 4A when in the 8 VSBT mode.

FIG. 5 shows the operation of the byte to symbol converter and mapper 36 of FIG. 4A when in the 8 VSBT mode. Interleaved data bytes are input to a data symbol interleaver 42 which breaks the data bytes into two bit uncoded data symbols and performs a nine way symbol interleave. Then, based on the states of convolutional encoders (discussed later in Part II) in a nine way convolutional encoder 44, uncoded priming (P) and uncoded segment synchronization (S) symbols are inserted into the stream at appropriate points by a symbol inserter 46. The nine way convolutional encoder 44 encodes the combination of priming symbols, segment synchronization symbols, and data symbols for the 288 data segments of the data frame 24. That is, the nine way convolutional encoder 44 encodes each to two input bits as three convolutionally encoded bits. The output of the nine way convolutional encoder 44 is coupled to a mapper 48 which maps each convolutionally encoded three bits into a symbol having one of eight output levels (see FIG. 4B, second column). Then, for every $289^{th}$ segment, a frame synchronization segment FS is inserted by the frame formatter 38.

Figure 6:
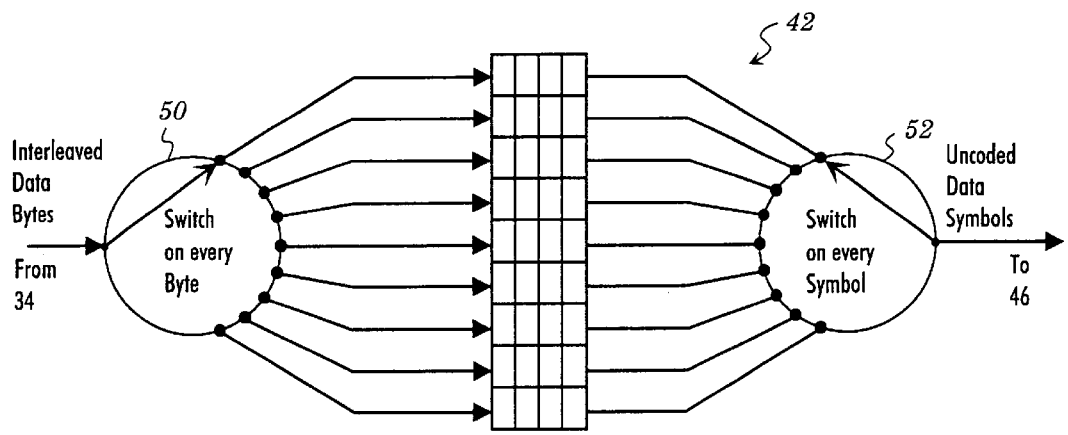
FIG. 6 shows the operation of the data symbol interleaver 42 of FIG. 5.

As shown in FIG. 6, interleaved data bytes are input to the data symbol interleaver 42 (which is preferably a 9×4 symbol interleaver). An input commutator 50 steps one place for each byte. Each data byte consists of four two-bit symbols designated $[X_0 X_1 X_2 X_3]$. A data segment contains 207 data bytes (828 data symbols). A segment of data bytes input to the data symbol interleaver 42, each composed of four two-bit symbols, can be designated as:

$$[0_0 0_1 0_2 0_3][1_0 1_1 1_2 1_3][2_0 2_1 2_2 2_3] \ldots [206_0 206_1 206_2 206_3]$$

The data symbol interleaver 42 outputs symbols as an output commutator 52 steps one place for each symbol. A cycle for the data symbol interleaver 42 is defined as a nine step sweep of the input commutator 50 (inputting a byte at each step) followed by four nine step sweeps of the output commutator 52 (outputting a symbol at each step). Thus each cycle interleaves 36 symbols (nine complete bytes). There are 828/36=23 cycles per data segment (288×23=6624 cycles per data frame). At the start of every data frame 24 and at the start of every data segment, both the input commutator 50 and the output commutator 52 are set to their top positions in order to begin the first cycle of the data segment. The data symbol output ordering from the output commutator 52 of the data symbol interleaver 42 for a data segment (not including the priming symbols and the segment sync symbols which are added by the symbol inserter 46) is:

$$\ldots 0_0 1_0 2_0 3_0 4_0 5_0 6_0 7_0 8_0 0_1 1_2 1_3 1 \ldots 7_3 8_3 9_0 10_0 \ldots 17_0 9_1 10_1 \ldots$$
$$206_2 198_3 199_3 200_3 201_3 202_3 203_3 204_3 205_3 206_3 \ldots$$

Following the symbol interleaving, the uncoded priming and segment synchronization symbols are inserted by the symbol inserter 46 at the proper points in the stream. Every data segment of 828 data symbols is preceded by four uncoded synchronization symbols. Also, four uncoded priming symbols are inserted just before the last five data symbols of the segment. This arrangement results in a nine symbol spacing between the priming and corresponding segment synchronization symbols so that they will enter the same convolutional encoder 44A–44I of the nine way convolutional encoder 44 shown in more detail in FIG. 7. The values for the priming and synchronization symbols, as further explained later in Part II, are determined by the current state of the convolutional encoder 44A–44I (one of nine) that they will enter. The symbol ordering at the output of the symbol inserter 46 for a complete data segment is:

$$\ldots S_0 S_1 S_2 S_3 0_0 1_0 2_0 3_0 4_0 5_0 6_0 7_0 8_0 0_1 1_2 1_3 1 \ldots 206_2 198_3 199_3 200_3$$
$$201_3 P_0 P_1 P_2 P_3 202_3 203_3 204_3 204_3 205_3 206_3 \ldots$$

Figure 7:
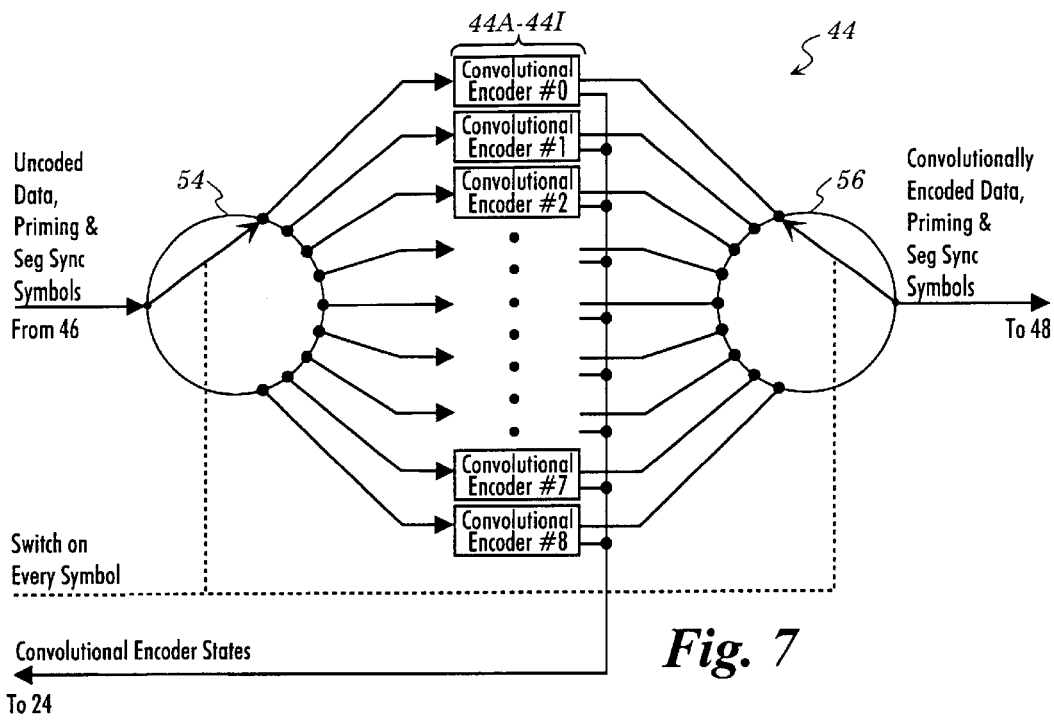
FIG. 7 shows the operation of the convolutional encoder 44 of FIG. 5.

As shown in FIG. 7, an input commutator 54 and an output commutator 56 of the nine way convolutional encoder 44 switch together on every symbol. A cycle may be defined as nine steps of the input and output commutators 54 and 56. If both the input and output commutators 54 and 56 are at the top position at the start of the first data segment of a data frame, then after nine segments (836 cycles), the input and output commutators 54 and 56 will again be at their top positions coincident with the start of a segment. Because there are 288 data segments per frame, and because 288/9= 32, which is an integer, the input and output commutators 54 and 56 will be at their top position at the start of every subsequent data frame 24. This operation may facilitate hardware design in the transmitter and receiver. The symbol ordering into and out of the 9 way trellis encoder 44 does not change.

The purpose of the previously described symbol interleaver 42 is to put the data symbols in an order so that those data symbols associated with a given byte pass through the same convolutional encoder (and same Viterbi decoder in the receiver). This "byte packing" has been found to be advantageous in suppressing certain impairments. If a given Viterbi decoder has an uncorrectable error, it tends to spread the error to subsequent symbols. If symbols from the same byte are packed into the same trellis decoder, fewer bytes on average are affected by the error spreading. More details on "byte packing" are presented in Part II below.

The outputs of the convolutional encoders 44A–44I are mapped by the mapper 48 (FIG. 5) to symbol levels according to the second column of FIG. 4B. Further details of each of the 9 convolutional encoder blocks 44A–44I (consisting of a convolutional coder and a mapper) are disclosed later in Part II.

The byte to symbol converter and mapper 36 feeds the frame formatter 38. For all VSB modes, the frame formatter 38 inserts the frame synchronization segment FS of 836 symbols into the symbol stream. This insertion occurs prior to every group of 288 data segments. The frame synchronization segment structure of FIG. 2B is given by the following:

[$S_0 S_1 S_2 S_3$][ATSC PN sequences][VSB mode][unspecified symbols][$P_0 P_1 P_2 P_3$ddddd]

Symbols [$S_0 S_1 S_2 S_3$] (there are four synchronization symbols) through the reserved symbols (there are 99 reserved symbols) are two level symbols. The symbols [$S_0 S_1 S_2 S_3$] represent the segment synchronization waveform. The PN sequence, consisting of 700 symbols, may be the same as is disclosed in the ATSC Digital Television Standard for the ATSC 6 MHZ system. The VSB mode ID coding (there are 24 mode symbols) is similar to that of the ATSC 6 MHZ system and is described below. For the non-TCM modes, the last nine symbols of the frame synchronization segment are unspecified two level symbols. For 8 VSBT, the last nine symbols of the frame synchronization segment, [$P_0 P_1 P_2 P_3$ddddd], are eight level symbols that are repeats of the last nine TCM coded symbols in the preceding data frame. There is no TCM or RS coding of frame synchronization symbols. It is noted that, in the 8 VSBT mode, the last nine frame synchronization symbols (repeat symbols) were already TCM coded during the previous segment.

Figure 14:
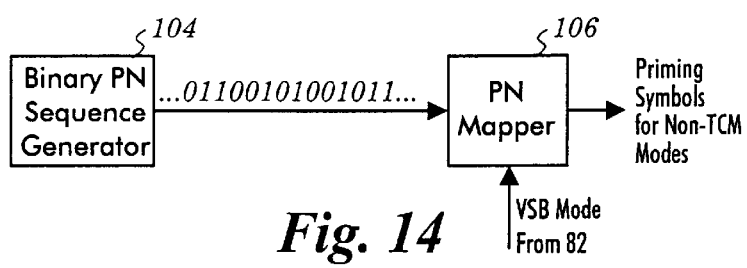
FIG. 14 shows the generation of priming symbols for non-TCM modes.

In non-TCM modes, the four two-level segment synchronization symbols are inserted by the frame formatter 38 at the start of each data segment. Four priming symbols consisting of multilevel pseudo random data are inserted by the frame formatter 38 into each data segment prior to the last five data symbols. The priming symbols added to the stream by the frame formatter 38 for the case of non-TCM modes are generated by a PN (pseudo random number) sequence generator 104 and a PN mapper 106 shown in FIG. 14. The PN sequence generator 104 outputs a stream of pseudo random binary data to the PN mapper 106. The PN mapper 106 is also supplied with the VSB mode (2, 4, 8, or 16) of the signal being encoded. The PN mapper 106 operates according to FIG. 4B, and its output is used to generate priming symbols for the non-TCM modes. The priming symbols are discarded by the receiver.

In the 8 VSBT mode, segment synchronization and priming symbols have already been added to the stream by the symbol inserter 46, so these symbols are not added to any data segments by the frame formatter 38.

The VSB mode is indicated by the three bytes (24 two level symbols) following the PN sequences in the frame synchronization segment. The three bytes are as follows: 0000 111P, ABC$\overline{P}$ $\overline{ABC}$1, and PABC $\overline{PABC}$, where the values of A, B, C, and P are given by the table below for the various modes. The third of these three bytes actually indicates the mode. The first two bytes are formed so that the mode may be read with the nine tap positive comb filter (see FIG. 8) enabled or bypassed. The values of A, B, C, and P for each mode are shown in the following table:

TABLE 1

| P | A | B | C | mode |
|---|---|---|---|------|
| 0 | 0 | 0 | 0 | 2 VSB |
| 1 | 0 | 0 | 1 | 4 VSB |

TABLE 1-continued

| P | A | B | C | mode |
|---|---|---|---|------|
| 1 | 0 | 1 | 0 | 8 VSB |
| 0 | 0 | 1 | 1 | reserved |
| 1 | 1 | 0 | 0 | 16 VSB |
| 0 | 1 | 0 | 1 | 8 VSBT |
| 0 | 1 | 1 | 0 | reserved |
| 1 | 1 | 1 | 1 | reserved |

VSB receivers that utilize a comb filter for rejecting co-channel interference have been disclosed in the '975 patent referenced above and in copending application 28869/35212. The use of two processing paths within a receiver, one path utilizing the comb filter and the other path bypassing the comb filter, with path selection determined by the presence of an interfering signal is disclosed in U.S. Pat. No. 5,260,793.

Figure 8:
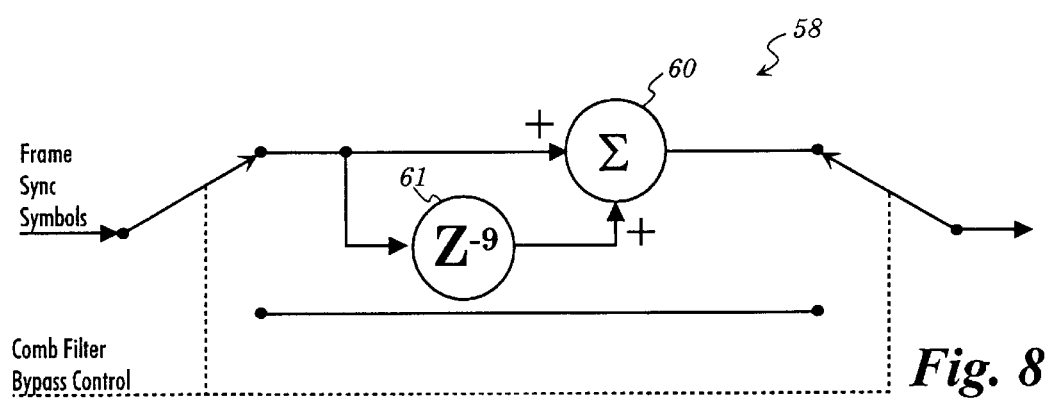
FIG. 8 illustrates a comb filter arrangement that may be used in connection with the present invention.

In the present invention, the receiver (as explained in copending application 28869/35212) uses a nine tap feed forward comb filter 58 with a summing element 60 and a nine symbol delay 61 as shown in FIG. 8. If the comb filter 58 is bypassed in the receiver, the VSB mode may be easily determined according to Table 1 above. If the comb filter 58 is not bypassed, the symbols will be altered by the summing element 60 in the comb filter 58. As shown above, each symbol of the third mode byte is preceded by a symbol of the same value nine symbols earlier. This mode symbol arrangement allows for easy determination of the mode even if the comb filter is enabled. For example, if it is assumed that the VSB mode is 8 VSBT, the symbol levels for the transmitted three byte mode field would be as follows:

-5-5-5-5 +5+5+5-5 +5-5+5+5 -5+5-5+5 -5+5-5+5 +5-5+5-5

These correspond to binary bits:

0000 1110 1011 0101 0101 1010

The last eight symbols (bits) indicate that the mode is 8 VSBT. If the comb filter is bypassed, these levels for the last eight symbols are easily interpreted as 0's or 1's so that the VSB mode can be determined.

If the comb filter is enabled, then the last eight filtered symbols output will be as follows:

-10+10-10+10 +10-10+10-10

These are also easily interpreted as 0's or 1's producing the same result as for the case of the comb filter bypassed. It should be understood that this method will work for any of the VSB modes.

In connection with the foregoing, it will be observed that the relative levels of the symbols of each VSB mode are evenly spaced and lie midway between the relative levels of selected symbols of all higher VSB modes. For example, relative level +112 of VSB mode M=8 lies midway between relative levels +120 and +104 of VSB mode M=16, relative level +96 of VSB mode M=4 lies midway between relative levels +112 and +80 of VSB mode M=8 and midway between relative levels +104 and +88 of VSB mode M=16, relative level +64 of VSB mode M=2 lies midway between relative levels +96 and +32 of VSB mode M=4, midway between relative levels +80 and +48 of VSB mode M=8, and midway between relative levels +72 and +56 of VSB mode M=16, and so on. Preferably the symbol levels are offset from the values shown by a predetermined amount (e.g., +20) prior to transmission in order to provide a small pilot for facilitating carrier acquisition in the receiver. Also, it will be observed that the data rate characterizing each VSB mode increases by one bit per symbol relative to the data rate of the immediately lower VSB mode, while its S/N ratio performance is reduced by one-half.

Figure 9:
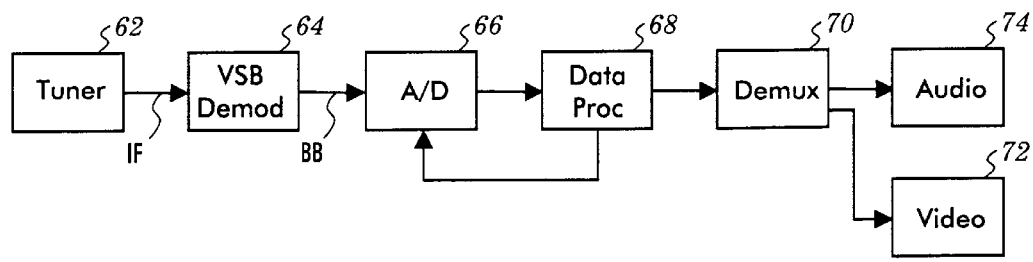
FIG. 9 is a simplified block diagram of a receiver constructed in accordance with the invention.

FIG. 9 is a simplified block diagram of a receiver constructed according to the present invention. The received RF television signal from the transmitter of FIG. 4A comprises an M-level VSB signal having the frame format of FIGS. 2A, 2B, and 2C. The received signal is converted to an IF frequency by a tuner 62, and the received signal at IF is applied to a VSB demodulator 64. The VSB demodulator 64 generates an analog baseband output signal comprising the M-level symbols at a rate of about 14.14 Megasymbols/sec. This analog signal is sampled by an analog to digital (A/D) converter 66 which converts the symbols to binary form and applies them to a data processor 68. The data processor 68 provides a feedback signal for controlling the analog to digital converter 66 to ensure that the analog baseband signal is sampled at the appropriate symbol times (as disclosed in U.S. Pat. No. 5,416,524). The data processor 68 applies the processed binary data, in the form of data bytes corresponding to the output of the television data source 30 shown in FIG. 4A, to a demultiplexer 70, which distributes the received data to a video processor 72 and to an audio processor 74, each of which includes appropriate decompression circuitry.

Figure 10:
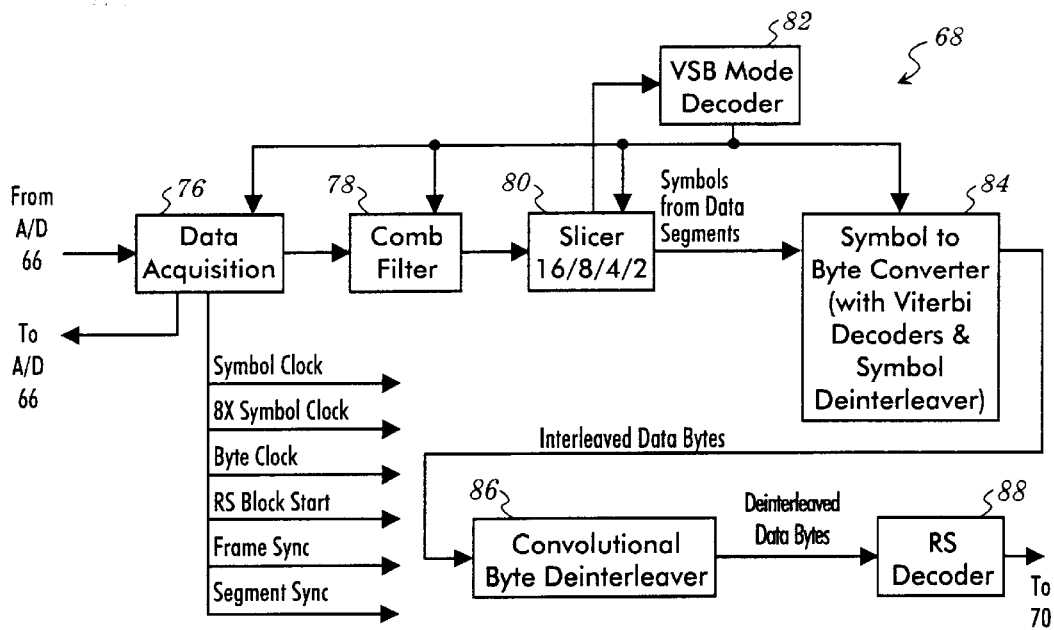
FIG. 10 is a more detailed showing of the data processor 68 of the receiver of FIG. 9.

The data processor 68 is shown in more detail in FIG. 10. The binary symbols from the analog to digital converter 66 are applied to a data acquisition circuit 76 which generates the feedback signal for controlling the analog to digital converter 66. The data acquisition circuit 76 also generates the following signals which are available to all blocks of FIG. 10: a symbol clock signal, a frame synchronization (FSYNC) signal, a segment synchronization signal, an 8 times symbol clock signal, a byte clock signal, and an RS block start signal. The symbol clock signal has a frequency of about 14.14 MHZ for all VSB modes. The FSYNC signal used in the preferred embodiment is approximately 53.7 Hz. The frame synchronization code of the frame synchronization segment FS enables derivation of the FSYNC signal which coincides in time with the first data symbol of the data segment DS0 of each of the data frames 24.

The binary symbols from the analog to digital converter 66 (representing the amplitudes of the sampled analog signal from the VSB demodulator 64) are applied by the data acquisition circuit 76 to a comb filter 78 such as that shown above in FIG. 8. The comb filter 78, which is for an 8 MHZ channel, is explained later. A comb filter for a 6 MHZ channel is explained in detail in U.S. Pat. No. 5,087,975. (The comb filter disclosed in this patent has a twelve symbol delay and uses a subtracting combiner as opposed to the nine symbol delay and adding combiner of FIG. 8.) The output of the comb filter 78 is applied to a multilevel slicer 80 which converts the received symbols back to bits according to the chart of FIG. 4B. The multilevel slicer 80 couples the sliced values of the VSB mode ID (24 two-level symbols) in the frame synchronization segment FS of each data frame 24 to a VSB mode decoder 82, which detects the 24 bit VSB mode ID and develops a 3-bit VSB mode select signal. This VSB mode select signal identifies the VSB mode (M=16, 8, 8T, 4, or 2) of the received symbols in order to control the data acquisition circuit 76, the comb filter 78, the multilevel slicer 80, and a symbol to byte converter 84 during the remainder of the respective data frame 24.

The multilevel slicer 80, which includes a nine line output bus, is responsive to the VSB mode select signal for converting the binary signal, representing the symbol amplitudes, to their corresponding bit values. Thus, in the M=2 VSB mode, each binary symbol amplitude signal is converted to the corresponding 1-bit signal on one of the nine output lines; in the M=4 VSB mode, each binary symbol amplitude signal is converted to the corresponding 2-bit signal on two of the output lines; in the M=8 VSB mode, each binary symbol amplitude signal is converted to the corresponding 3-bit signal on three of the output lines; and, in the M=16 VSB mode, each binary symbol amplitude signal is converted to the corresponding 4-bit signal on four of the output lines. In all VSB modes, the multilevel slicer 80 does not output symbols from the frame synchronization segment. In the 8 VSBT mode, entire data segments are output, including data segment synchronization and priming symbols. In modes 2, 4, 8, and 16, only data symbols are output. The nine-line output of the multilevel slicer 80, together with the 3-bit VSB mode select signal from the VSB mode decoder 82 and the timing signals from data acquisition circuit 76, are coupled to the symbol to byte converter 84.

For the non-TCM modes, the symbol to byte converter 84 operates as described in U.S. Pat. No. 5,631,645. For the 8 VSBT mode, the symbol to byte converter 84 operates as a Viterbi decoder/symbol deinterleaver as explained below and later in Part II. The output of the symbol to byte converter 84 supplies a byte deinterleaver 86 that, in turn, supplies an RS decoder 88. The symbol to byte converter 84 converts the input bits representing the received symbols into a series of 8-bit data bytes for each of the VSB modes. The byte deinterleaver 86 deinterleaves the convolutionally interleaved data bytes supplied by the symbol to byte converter 84, and the RS decoder 88 performs error correction on the deinterleaved data bytes.

Figure 11:
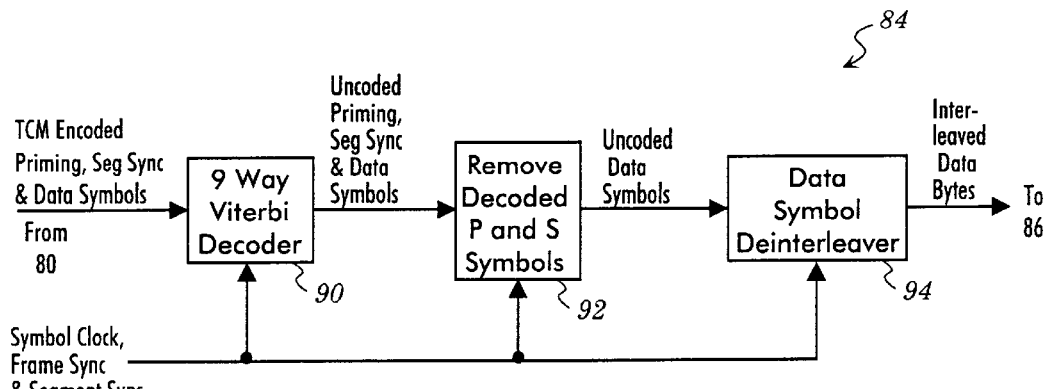
FIG. 11 is a more detailed showing of the operation of the symbol to byte converter 84 of FIG. 10 when the received signal is in 8 VSBT mode.

For the 8 VSBT mode, the operation of the symbol to byte converter 84 in the receiver is explained below in connection with FIGS. 11–13 and in more detail in Part II. FIG. 11 shows an overview of the Viterbi decoding system within the symbol to byte converter 84. TCM encoded priming, segment sync, and data symbols are decoded in a nine way Viterbi decoder 90. The way in which a Viterbi decoder decodes TCM encoded signals is well known. The uncoded priming and segment synchronization symbols are removed from the decoded symbol stream by a priming and segment synchronization symbol stripper 92. A 9×4 symbol deinterleaver 94 is used to form the uncoded data symbols back into bytes. All operations are synchronized by symbol clock, frame synchronization, and segment sync.

Figure 12:
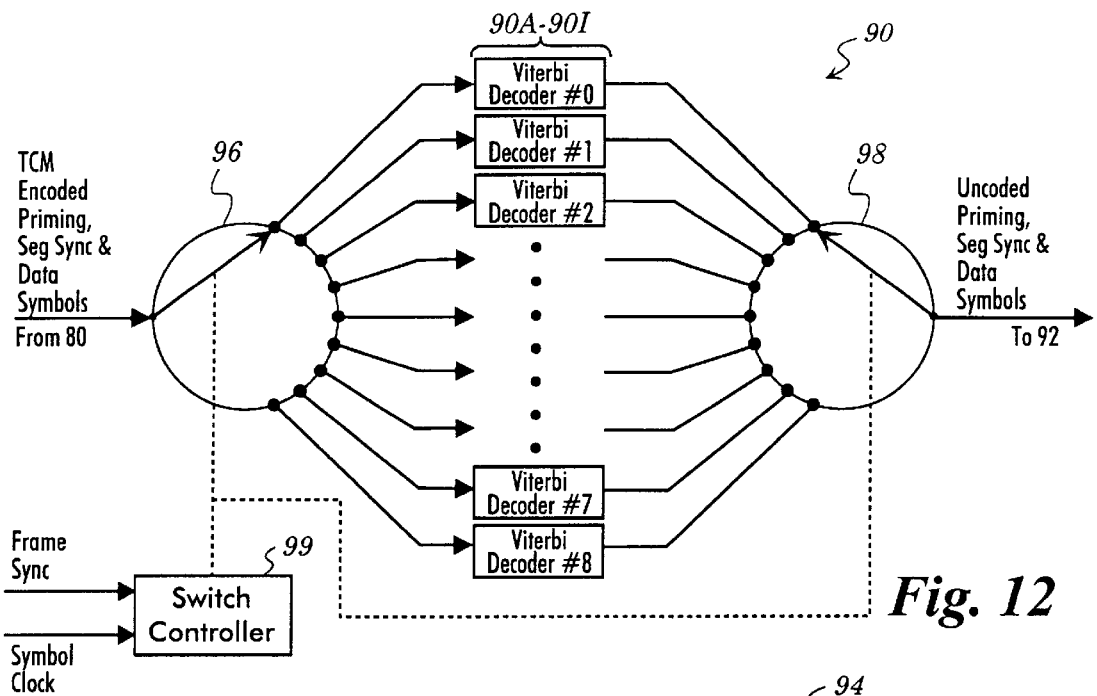
FIG. 12 is a more detailed showing of the nine way Viterbi decoder 90 of FIG. 11.

The nine way Viterbi decoder 90 is shown in FIG. 12. The individual Viterbi decoders 90A–90I each may utilize the well know Viterbi decoding method. Input and output commutators 96 and 98 switch together on every symbol clock, under control of a switch controller 99 which operates in response to the symbol clock and frame sync. A decoder cycle is defined as a nine step sweep of both the input and output commutators 96 and 98. Both of the input and output commutators 96 and 98 are forced to their top positions by the frame synchronization signal. After nine data segments (836 cycles), the input and output commutators 96 and 98 will again be at their top positions coincident with the start of a segment. Because there are 288 data segments per data frame, and because 288/9=32, which is an integer, the input and output commutators 96 and 98 will be at their top position at the start of every subsequent data frame 24.

The nine way Viterbi decoder 90 outputs uncoded priming, segment sync, and data symbols. The symbol ordering into and out of the nine way Viterbi decoder 90 does not change and are indicated by the following symbols:

$$\ldots S_0 S_1 S_2 S_3 0_0 1_0 2_0 3_0 4_0 5_0 6_0 7_0 8_0 0_1 1_1 2_1 3_1 \ldots$$
$$206_2 198_3 199_3 200_3 201_3 P_0 P_1 P_2 P_3 202_3 203_3 204_3 205_3 206_3 \ldots$$

At the output of the nine way Viterbi decoder 90, the priming and segment synchronization symbols are easily removed from the data stream by the priming and segment synchronization symbol stripper 92 of FIG. 11 by reference to the segment synchronization timing signal recovered in earlier parts of the receiver. At this point only uncoded interleaved data symbols remain as indicated by the following symbols:

$$\ldots 0_0 1_0 2_0 3_0 4_0 5_0 6_0 7_0 8_0 0_1 1_1 2_1 3_1 \ldots 7_3 8_3 9_0 10_0 \ldots 17_0 9_1 10_1 \ldots$$
$$206_2 198_3 199_3 200_3 201_3 202_3 203_3 204_3 205_3 206_3 \ldots$$

Figure 13:
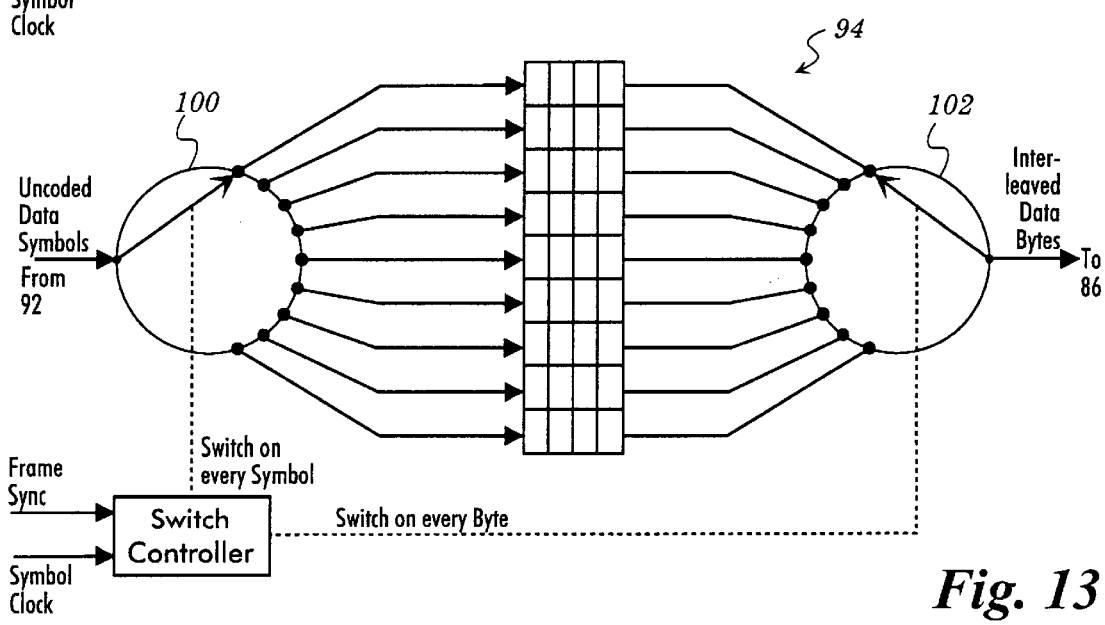
FIG. 13 is a more detailed showing of the symbol deinterleaver 94 of FIG. 11.

Symbol to byte conversion is achieved by the 9×4 symbol deinterleaver 94 which is shown in more detail in FIG. 13. Uncoded data symbols are input to the 9×4 symbol deinterleaver 94. An input commutator 100 steps one place for each data symbol. An output commutator 102 steps one place for each data byte, where each byte consists of four two-bit symbols.

A cycle for the 9×4 symbol deinterleaver 94 is defined as four nine-step sweeps of the input commutator 100 (which inputs a two bit data symbol at each step) followed by a nine step sweep of the output commutator 102 (which outputs a byte at each step). Thus, each cycle deinter-leaves 36 symbols (nine complete bytes). There are 828/36=23 cycles per data segment and 288×23=6624 cycles per data frame. At the start of every data frame 24, both the input and output commutators 100 and 102 are forced to their top positions to begin the first cycle of the data segment. Because there are exactly 6624 cycles per data frame, the commutators will be at their top position at the start of every subsequent data frame. Therefore, a segment of data bytes output from the 9×4 symbol deinterleaver 94 is as follows:

$$[0_0 0_1 0_2 0_3][1_0 1_1 1_2 1_3][2_0 2_1 2_2 2_3] \ldots [206_0 206_1 206_2 206_3]$$

As described earlier, the outputs of the symbol to byte converter 84 are applied to the byte deinterleaver 86. As will be explained in further detail hereinafter, the byte deinterleaver 86 deinterleaves the convolutionally interleaved data bytes received from the symbol to byte converter 84 using a minimum of memory.

As is well known, byte interleaving is done at the transmitter (see the convolutional data byte interleaver 34 of FIG. 4A) to spread contiguous data bytes apart from each other to help immunize the transmitted data from burst noise. In the receiver, the interleaved bytes must be deinterleaved to re-establish their original relationship prior to forward error correction. Thus, burst noise of some given time duration will corrupt only a limited number of bytes within an RS block of the deinterleaved data. These corrupted bytes can be corrected by the RS decoder 88 of the receiver (FIG. 10).

The interleaving algorithm used is selected in anticipation of the maximum expected burst noise duration at the fastest byte clock rate (i.e., corresponding to VSB mode M=16) to ensure that the RS decoder 88 is capable of error correcting the corrupted deinterleaved data bytes. Thus, as the maximum expected burst noise duration increases, the interleaving algorithm must spread contiguous data bytes farther apart. Alternatively, a more powerful RS code may be used, but this approach has the disadvantage of using more overhead, i.e., requiring more bytes for error correction. Also, by referencing the system to the highest byte clock rate (corresponding to 16 VSB), increased burst error protection will be provided as the VSB mode and the corresponding byte rate decrease, because the interleave pattern is effected over a given number of bytes regardless of VSB mode.

Convolutional interleave algorithms are commonly used to immunize transmitted data from burst noise. Such algorithms delay the individual bytes of successive groups of bytes, sometimes referred to as the interleave depth, by different amounts to effectively scatter the bytes over a portion or all of the data frame 24. Deinterleaving is effected by delaying the received bytes by opposite amounts. In implementing such a system, three parameters are of particular significance; the maximum expected burst length BL, the number of byte errors T which the RS decoder 88 can correct, and the RS block size.

As mentioned previously, there preferably are an integral number of RS blocks in the data frame 24 so that the RS decoder 88 can be synchronized by the frame synchronization signal FSYNC. By selecting an interleave group size (of which there are preferably an integral number in each frame) equal to a parameter B=BL/T and by selecting the different delays as integral multiples of a parameter N equal to or greater than the RS block size, the RS decoder 88 will be able to correct the deinterleaved data for burst noise up to the maximum expected duration of BL byte clocks.

Consider the simplified example of a system in which the maximum expected burst length is four data byte clocks and in which the RS decoder 88 is capable of correcting one data byte error in each eight data byte RS block (i.e., BL=4, T=1, N=8). Using these parameters, the interleave group size B=BL/T=4/1=4. Convolutional interleaving is performed using these parameters such that for each group of B=4 data bytes, the first data byte is exposed to a delay of 0, the second to a delay of 1N=8 data byte clocks, the third to a delay of 2N=16 data byte clocks, and the fourth to a delay of 3N=24 data byte clocks. Deinterleaving is effected by reversing the delays such that for each group of B=4 received interleaved data bytes, the first-is delayed by 3N=24 data byte clocks, the second by 2N=16 data byte clocks, the third by 1N=8 data byte clocks, and the fourth by 0.

Conventional convolutional deinterleavers implementing the above algorithm comprise a memory having (B−1)N/2 memory locations. For realistic values of B and N, which are typically much larger than the values used in the simplified example given above, the conventional deinterleaver has a very complex architecture because of the large number of shift registers required. An alternate architecture which may be employed uses a standard linear memory array for which a large number of FIFO head and tail pointers must be maintained in hardware. This is a very complex task and thus highly undesirable.

These problems are solved in U.S. Pat. No. 5,572,532 by using a linear memory array with an address generator for generating a repeating sequence of read-write addresses that results in correctly deinterleaving the received data. The memory array is of a relatively small size utilizing only one memory location in excess of the number required to impose the different delays on the respective data bytes of each group. In the system described here, B=54, N=216, and M=4. As explained in U.S. Pat. No. 5,572,532, it is necessary that the number of data bytes per data frame be exactly divisible by B so that the deinterleaver address generator may use frame synchronization for synchronization. FIG. 3A shows that this is the case for all VSB modes.

Part II

Figure 15:
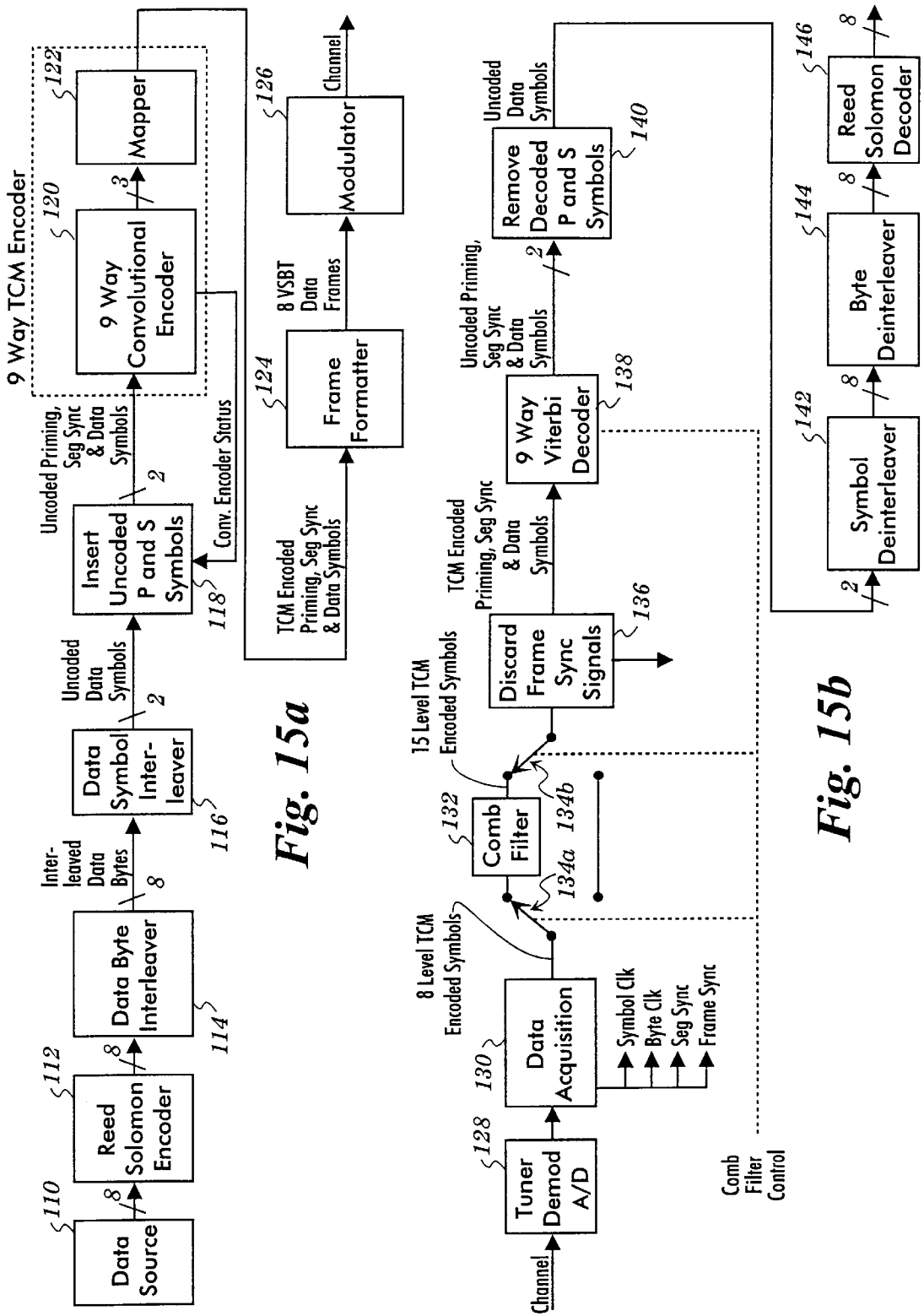
FIG. 15a is a more detailed block diagram of a transmitter operating in 8 VSBT mode in accordance with the invention.
FIG. 15b is a more detailed block diagram of a receiver operating in 8 VSBT mode in accordance with the invention.

FIG. 15a, which is derived from a combination of Part I FIGS. 4a and 5, generally illustrates a novel TCM transmitter. While the multilevel VSB digital application is contemplated in the preferred embodiment of the invention, it will be understood that the invention is more general in nature and, thus, may be applied to other types of transmission and reception systems, including lower resolution video systems as well as non-video based data systems. Also, other modulation techniques, such as those employing, for example, quadrature amplitude modulation (QAM), may be employed.

As shown in FIG. 15a, a data source 110 provides a succession of data bytes which may, for example, comprise a compressed HDTV signal, a compressed television signal of standard definition, or any other digital data signal. As discussed below, the data bytes will be preferably, although not necessarily, arranged in successive frames as already described in Part I, where each frame includes one frame sync segment and 288 data segments. Each data segment comprises 836 two-bit symbols occurring at a symbol rate of about 14.14 Megasymbols/sec.

The data bytes from the data source 110, which also provides a plurality of timing signals, are applied to a Reed-Solomon encoder 112 for forward error correction coding and therefrom to a data byte interleaver 114. The data byte interleaver 114 reorders the data bytes to reduce the susceptibility of the system to burst noise, as discussed above.

The interleaved data bytes from the data byte interleaver 114 are applied to a data symbol interleaver 116 which provides, in a preferred embodiment, two output bit streams $X_1$, $X_2$ at the symbol rate, where each bit pair $X_1$, $X_2$ corresponds to a data symbol. In particular, the data symbol interleaver 116 is a 9×4=36 block interleaver (to be described in detail hereinafter) which interleaves the 828 two-bit data symbols of each data segment.

The stream of uncoded two-bit data symbols from the data symbol interleaver 116 are coupled to a priming (P) and segment sync (S) symbol inserter 118 (to be described in detail hereinafter) which inserts uncoded priming symbols and segment sync symbols at appropriate points in each data segment. The uncoded priming symbols, segment sync symbols, and data symbols are coupled to a nine way convolutional encoder 120 for conversion to three output bits per symbol as will be described in further detail hereinafter. A feedback path from the nine way convolutional encoder 120 to the priming and segment sync symbol inserter 118 provides a feedback signal which indicates the states of the convolutional encoders of the nine way convolutional encoder 120 and, as will be explained, affects the values of the inserted uncoded priming symbols and segment sync symbols. Because the nine way convolutional encoder 120 is characterized by a nine-symbol delay, it may be thought of as comprising nine parallel encoders each operating at 1/9 the symbol clock rate.

The stream of convolutionally encoded three bit symbols developed at the output of the nine way convolutional encoder 120 is applied to a symbol mapper 122 which maps each three bit symbol to a corresponding one of M amplitude or phase levels (where M=8 in this case). The TCM coded priming symbols, segment sync symbols, and data symbols from the symbol mapper 122 are fed to a frame formatter 124 and therefrom to a VSB modulator 126 for transmission as a plurality of eight-level symbols. A pilot may be added to the transmitted signal in order to offset the amplitude of each of the symbols by a predetermined amount.

FIG. 15b represents a 8 VSBT (TCM encoder) receiver derived from a combination of Part I, FIGS. 9–11. The transmitted signal is received by a receiver including a tuner, demodulator, and A/D 128 corresponding to the tuner 16, the demodulator 18, and the A/D 20 of FIG. 1. The output of the tuner, demodulator, and A/D 128 comprises a stream of multibit eight-level symbols (e.g., eight to ten bits per symbol). A data acquisition unit 130 derives various clock and synchronization signals from the received symbol stream. These clock and synchronization signals include the symbol clock, the byte clock, a segment sync signal, and a frame sync signal. The output of the data acquisition unit 130 is coupled to a selector switch 134a/134b (see U.S. Pat. No. 5,260,793 for an exemplary embodiment of a circuit for operating a switch to a first processing path comprising a comb filter 132 and to a second processing path bypassing the comb filter 132). The output of the selector switch 134a/134b is coupled to a frame sync symbol discard unit 136 which discards the 836 symbols comprising the frame sync segment of each received data frame while allowing all the-other symbols of the data frames (i.e., the TCM encoded priming symbols, segment sync symbols, and data symbols) to pass through to a nine way Viterbi decoder 138. The VSB mode decoder 82 is not shown in FIG. 15b for convenience. However, it should be understood that the VSB mode ID, which may also be referred to herein as the VSB mode code, is detected from the frame sync segment before the frame sync symbol discard unit 136 discards the frame sync segment.

The output of the nine way Viterbi decoder 138 consists of the uncoded priming symbols, segment sync symbols, and data symbols. Accordingly, the output of the nine way Viterbi decoder 138 comprises reconstructions of the bit streams $X_1$ and $X_2$. The bit streams $X_1$ and $X_2$ are coupled to a priming symbol and segment sync symbol stripper 140 which discards the priming symbols and segment sync symbols, passing only the uncoded data symbols to a symbol deinterleaver 142. The symbol deinterleaver 142 reconstructs the original interleaved data bytes. These interleaved data bytes are then deinterleaved by a byte deinterleaver 144, and the deinterleaved data bytes are error corrected by a Reed-Solomon decoder 146 for application to the remainder of the receiver.

Figure 16:
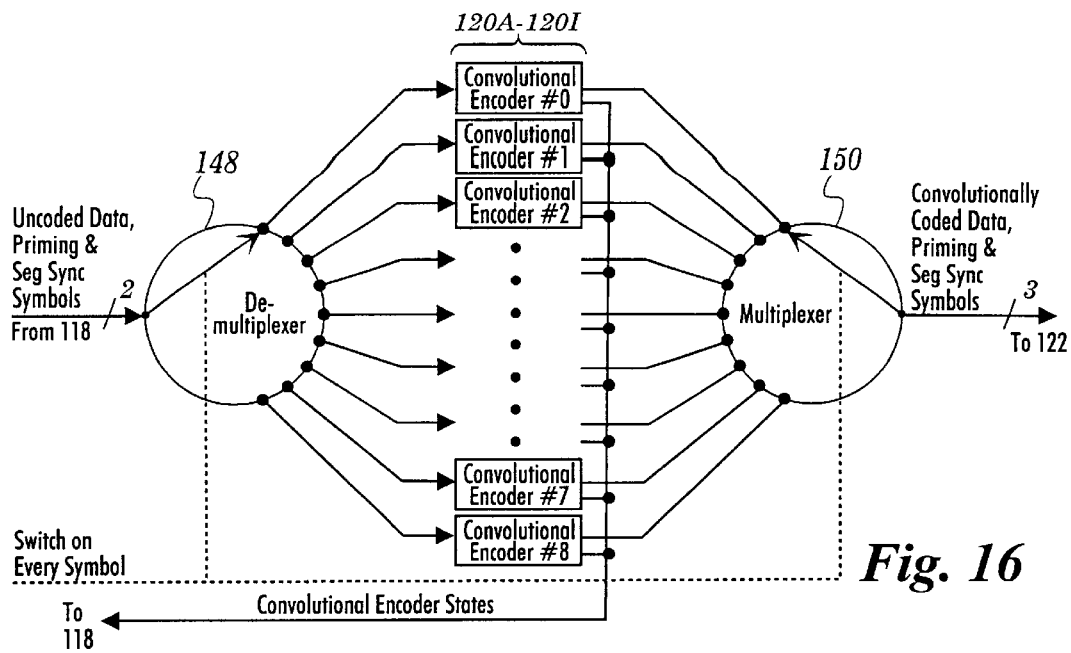
FIG. 16 illustrates the nine way convolutional encoder 120 of FIG. 15a in additional detail.

The TCM encoding process involves the data symbol interleaver 116, the priming and segment sync symbol inserter 118, the nine way convolutional encoder 120, and the symbol mapper 122 of FIG. 15a. It is helpful to first describe the details of the nine way convolutional encoder 120 and the symbol mapper 122. FIG. 16 functionally shows the nine way convolutional encoder 120 (which is similar to FIG. 7 and which is repeated here for convenience). An input commutator 148 (i.e., demultiplexer) and an output commutator 150 (i.e., multiplexer) respectively switch on every symbol so that symbols separated by nine symbol intervals in the multiplexed stream are processed by the same one of the nine way convolutional encoders 120A–120I.

Figure 17:
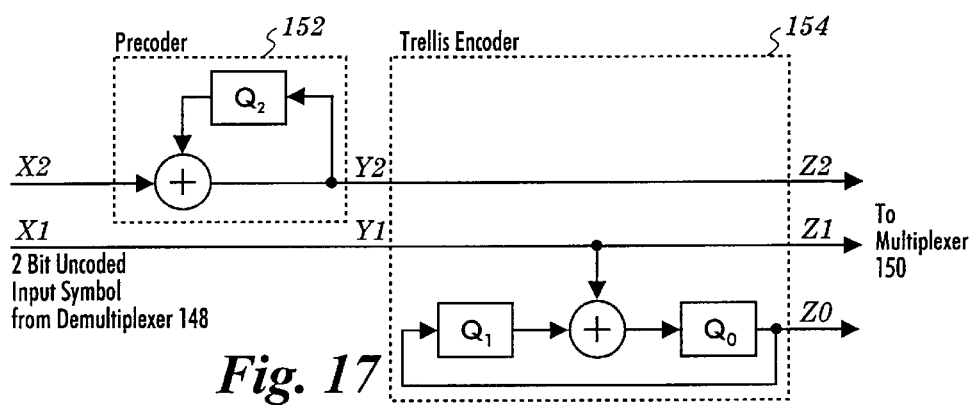
FIG. 17 illustrates a representative one of the convolutional encoder units of FIG. 16 in additional detail.

FIG. 17 shows the details of a representative one of the identical nine way convolutional encoders 120A–120I. The convolutional encoder of FIG. 17 consists of a precoder 152 and a trellis encoder 154. The precoder 152. comprises a summer and a one symbol delay $Q_2$ which precode an input bit X2 as an intermediate output bit Y2. The input bit X1 passes directly as an intermediate bit Y1. The trellis encoder 154 comprises a summer and two one symbol delays $Q_0$ and $Q_1$ which trellis encode the intermediate bits Y1 and Y2 as three bit convolutionally encoded symbols. The three bit convolutionally encoded symbols are coupled by the output commutator 564 to the symbol mapper 122 which in turn outputs symbols each having a corresponding level from −7 to +7. Accordingly, each of the nine way convolutional encoders 120A–120I accepts two bit uncoded input symbols $[X_2X_1]$ and outputs three bit convolutionally encoded symbols.

Figure 18:
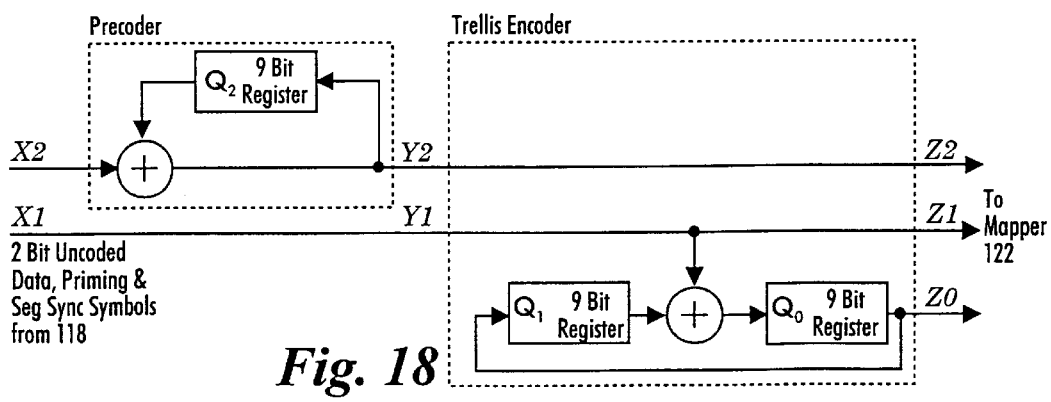
FIG. 18 illustrates a convolutional encoder which is an alternative to the nine way convolutional encoder shown in FIG. 17.

It should be understood that the nine way convolutional encoder of FIG. 16 with the nine individual encoders, each of which is shown in FIG. 17, can be equivalently represented by the single encoder of FIG. 18, where each of the delay elements $Q_2$, $Q_1$, and $Q_0$ represent a nine symbol delay. The method of FIGS. 16 and 17 is more useful for explaining the advantages of the system, especially with respect to the interaction of the comb filter and the Viterbi Decoder in the receiver (discussed later). However, the method of FIG. 18 may be better for building actual hardware. Both methods are exactly equivalent. For FIG. 18, it is noted that the state fed back to the priming and segment sync symbol inserter 118 consists of a single bit from each of the nine symbol delay elements $Q_2$, $Q_1$, and $Q_0$ (a total of three bits), those bits being the ones that have resided in each respective nine symbol delay element for the longest time.

Figures 19, 20:
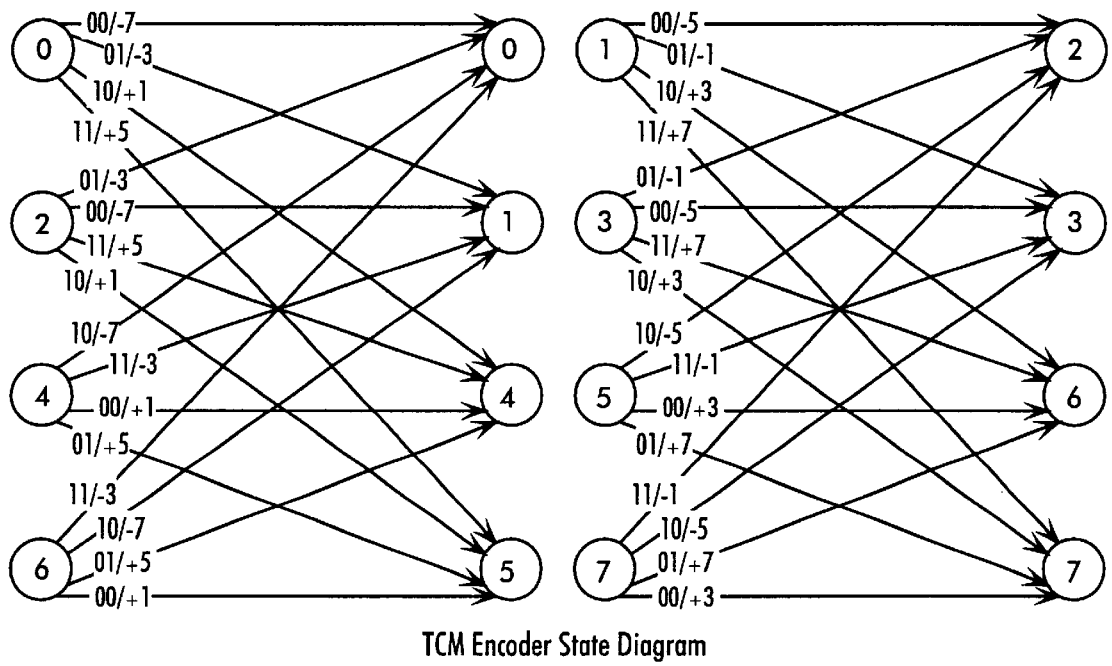

The symbol mapping function implemented by the symbol mapper 122 is shown in detail in FIG. 19. This symbol mapping function is essentially the same as the mapping shown in the second column of FIG. 4B, except that for convenience the output level values have been divided by sixteen. This symbol mapping-function relates each possible three bit convolutionally encoded symbol and its corresponding level of −7 to +7.

FIG. 20 is a state transition diagram for the representative convolutional encoder of FIG. 17 in combination with the symbol mapping function of FIG. 19. The states shown in each circle are decimal representations of the binary state $[Q_2Q_1Q_0]$. Each branch is labeled with the uncoded input symbol $[X_1X_2]$ and the associated TCM coded output symbol level (−7 to +7) from the symbol mapper 122. For example, a branch, which has the uncoded input symbol [00] and the associated TCM coded output symbol level −7 and which starts in decimal state 2, transitions to decimal state 1.

The priming and segment sync symbol inserter 118 accepts a stream of uncoded data symbols from the data symbol interleaver 116 and inserts segment sync and priming symbols into the steam at appropriate points. The value of these inserted symbols, as will be explained, depends on the state of the particular convolutional encoder (one of 120A–120I) that the symbol will enter. Every data segment consists of four segment sync symbols followed by 823 data symbols followed by four priming symbols followed by five more data symbols, as described in Part I. The segment sync symbol pattern at the input to the frame formatter 124 must occur every 836 symbols and consists of the four TCM coded symbols [+5−5−5+5] at the output of the symbol mapper 122.

Figure 21:
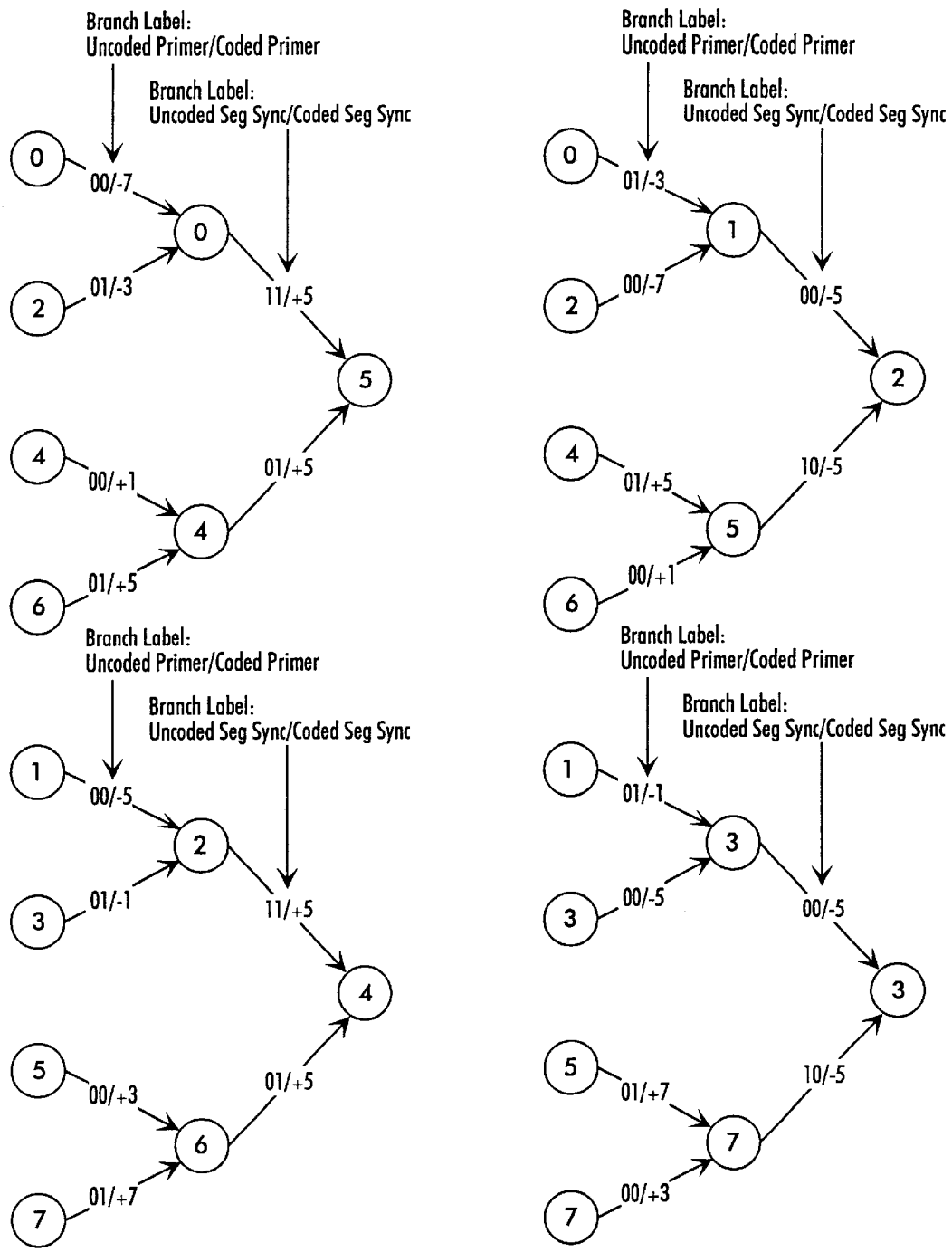
FIG. 21 illustrates the state transitions that occur in the FIG. 17 encoder in order to output trellis encoded segment sync symbols.

Each of these segment sync symbols will come at the proper time from a different one of the nine way convolutional encoders 120A–120I in combination with the symbol mapper 122. In order for one of the nine way convolutional encoders 120A–120I in combination with the symbol mapper 122 to output a +5 or −5 when required, that encoder must already be in a particular state. A priming symbol is provided to that one of the nine way convolutional encoders 120A–120I in order to put it in a state so that it will, with the symbol mapper 122, output a +5 or −5 in response to the next uncoded input symbol. From FIG. 20, it can be seen that one of the nine way convolutional encoders 120A–120I and the symbol mapper 122 can output +5 only if that particular convolutional encoder is in one of the states 0, 2, 4, or 6, and it can output −5 only if that convolutional encoder is in one of the states 1, 3, 5 or 7. FIG. 21 shows, for each encoder state, an uncoded input priming symbol and associated TCM coded output priming symbol, then the subsequent uncoded input segment sync symbol and associated TCM coded output segment sync symbol (±5).

It can be seen that a TCM coded segment sync symbol (±5) is always preceded by a priming symbol in the same one of the nine way convolutional encoders 120A–120I. This arrangement results in each of the four TCM coded segment sync symbols $[S_0 S_1 S_2 S_3]$ in the multiplexed output stream being preceded by one of four TCM coded priming symbols $[P_0 P_1 P_2 P_3]$ such that each priming symbol is spaced nine symbols ahead of its corresponding segment sync symbol as shown by the following symbol pattern:

$$\ldots xxx P_0 P_1 P_2 P_3 xxxxx S_0 S_1 S_2 S_3 xxx \ldots$$

Thus, in order to generate the TCM coded segment sync waveform, the priming and segment sync symbol inserter 118 must observe the state of the appropriate one of the nine way convolutional encoders 120A–120I and, based on the observed state, insert the correct uncoded priming symbol and the correct uncoded segment sync symbol as shown in FIG. 21. For example, if the nine way convolutional encoder 120C is in the decimal state 2 and it is necessary to output +5 for a particular segment sync symbol, the uncoded priming symbol 01 followed by the uncoded segment sync symbol 11 are inserted for the convolutional encoder 120C. The receiver will use the TCM coded segment sync waveform pattern for synchronization (this pattern is shown in U.S. Pat. No. 5,416,524), and will then discard the priming and segment sync symbols after TCM decoding.

It should be noted that, in order to output a coded segment sync symbol S=+5, each of the eight possible initial TCM encoder states will result in an output of a different one of the eight possible coded priming symbols (P) prior to the coded segment sync symbol S=+5. Assuming that all the encoder states are equally probable, all eight coded priming symbols are equally probable. Therefore, the coded priming symbols $P_0 P_1 P_2 P_3$ will be random. The same is true for coded priming symbols preceding a coded segment sync symbol S=−5.

Figure 22:
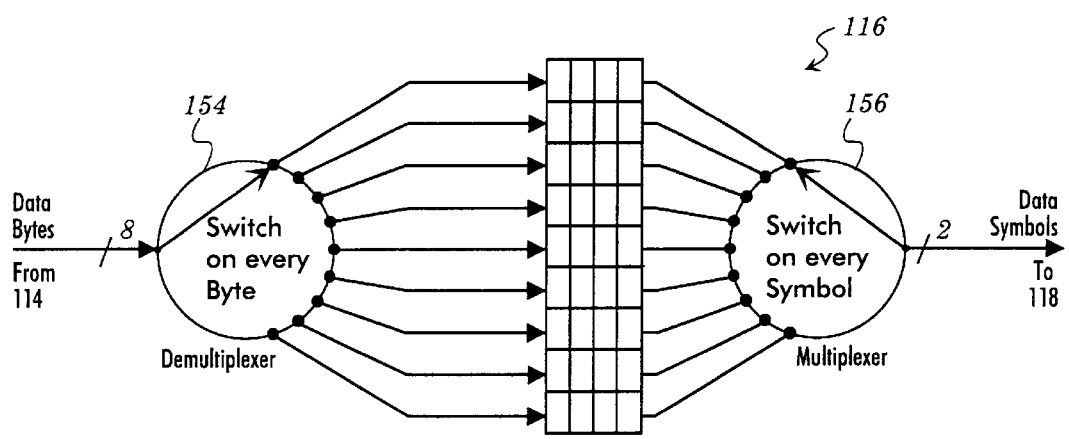
FIG. 22 illustrates the 9×4 data symbol interleaver 116 of FIG. 15a in additional detail.

The data symbol interleaver 116, which includes an input commutator 154 and an output commutator 156, is shown in FIG. 22 and is the same as the data symbol interleaver 42 shown in FIG. 6. The operation of the data symbol interleaver 116 is the same as described in Part I in connection with FIG. 6. As stated previously, the data bytes, which are composed of two bit symbols, are input to the data symbol interleaver 116 in the following order:

$$[0_0 0_1 0_2 0_3][1_0 1_1 1_2 1_3][2_0 2_1 2_2 2_3] \ldots [206_0 206_1 206_2 206_3]$$

The data symbol interleaver 116 outputs data symbols in the following order:

$$\ldots 0_0 1_0 2_0 3_0 4_0 5_0 6_0 7_0 8_0 0_1 1_1 2_1 3_1 \ldots 7_3 8_3 9_0 10_0 \ldots 17_0 9_1 10_1 \ldots$$
$$206_2 198_3 199_3 200_3 201_3 202_3 203_3 204_3 205_3 206_3 \ldots$$

An overview of the operation of the nine way convolutional encoder 120 of FIG. 16 was discussed in Part I with reference to FIG. 7. As discussed in connection with FIG. 7, the input commutator 54 and the output commutator 56 of the nine way convolutional encoder 44. switch together on every symbol. A cycle may be defined as nine steps of the input and output commutators 54 and 56. If both the input and output commutators 54 and 56 are at the top position at the start of the first data segment of a data frame, then after nine segments (836 cycles), the input and output commutators 54 and 56 will again be at their top positions coincident with the start of a segment. Because there are 288 data segments per frame, and because 288/9=32, which is an integer, the input and output commutators 54 and 56 will be at their top position at the start of every subsequent data frame 24. This operation may facilitate hardware design in the transmitter and receiver. The symbol ordering into and out of the 9 way trellis encoder does not change. The operation of the arrangement of FIG. 16 is essentially the same. In either case, the symbol ordering is not changed by the nine way convolutional encoder 120. Accordingly, the symbol ordering out of the output commutator 150 of the nine way convolutional encoder 120 is the following:

$$\ldots 0_0 1_0 2_0 3_0 4_0 5_0 6_0 7_0 8_0 0_1 1_1 2_1 3_1 \ldots 7_3 8_3 9_0 10_0 \ldots 17_0 9_1$$
$$10_1 \ldots 206_2 198_{83} 199_3 200_3 201_3 P_0 P_1 P_2 P_3 202_3 203_3 204_3 205_3$$
$$206_3 \ldots$$

The purpose of the data symbol interleaver 116 is to put the data symbols in an order so that those data symbols associated with a given byte pass through the same one of the nine way convolutional encoders 120A–120I (and the same Viterbi decoder in the receiver). This "byte packing" has been found to be advantageous in suppressing certain impairments. If a given Viterbi decoder has an uncorrectable error, it tends to spread the error to subsequent symbols. If symbols from the same byte are packed into the same Viterbi decoder, fewer bytes on average are affected by the error spreading.

It should be noted that the insertion of the four priming symbols into the symbol steam will prevent proper "byte packing" for the last five data symbols of each data segment. This lack of proper byte packing is not statistically significant and should not measurably affect performance. The table of FIG. 23 shows how the symbols corresponding to particular bytes enter the nine way convolutional encoders 120A–120I over a nine segment (836 cycle) span. Each nine symbol column shows which symbols enter the nine way convolutional encoders 120A–120I for one cycle.

The symbol mapper 122 outputs TCM encoded priming symbols, segment sync symbols, and data symbols to the frame formatter 124 which, as explained later, inserts a frame sync segment before every group of 288 data segments.

The symbol mapper 122 has two attributes of particular note. First, as shown by the mapping function of FIG. 19, the eight symbol levels are divided into four subsets a, b, c, and d, where each subset is identified by a particular state of the output bits $Z_1 Z_0$. Thus, $Z_1 Z_0 = 00$ selects symbol subset d, $Z_1 Z_0 = 01$ selects symbol subset c, $Z_1 Z_0 = 10$ selects symbol subset b, and $Z_1 Z_0 = 11$ selects subset a. Within each subset, the respective symbol amplitudes differ by a magnitude of eight units. Second, successive symbol level pairs (−7, −5), (−3, −1), (+1, +3) and (+5, +7) are selected by common states of output bits $Z_2 Z_1$. Thus, for example, output bits $Z_2 Z_1 = 00$ selects both symbol amplitude levels −7 and −5, and so on. Both of the foregoing attributes of the symbol mapper 122 are useful in achieving reduced receiver complexity as will be described in more detail hereinafter.

Accordingly, it should be noted that the output bits $Z_1 Z_0$ can be used to select a symbol subset and the output bit $Z_2$ can be used to select a symbol of the selected subset. This arrangement has been described in relation to an 8 VSB system where the three bits $Z_2 Z_1 Z_0$ are used to select a subset and a symbol of the selected subset. This arrangement can be generalized where any number of bits $Z_N$ can be used to select a subset and a symbol of the selected subset. In this case, the output bits $Z_1Z_0$ can be used to select a symbol subset and the output bit $Z_2$–$Z_N$ can be used to select a symbol of the selected subset.

Figures 24, 25:
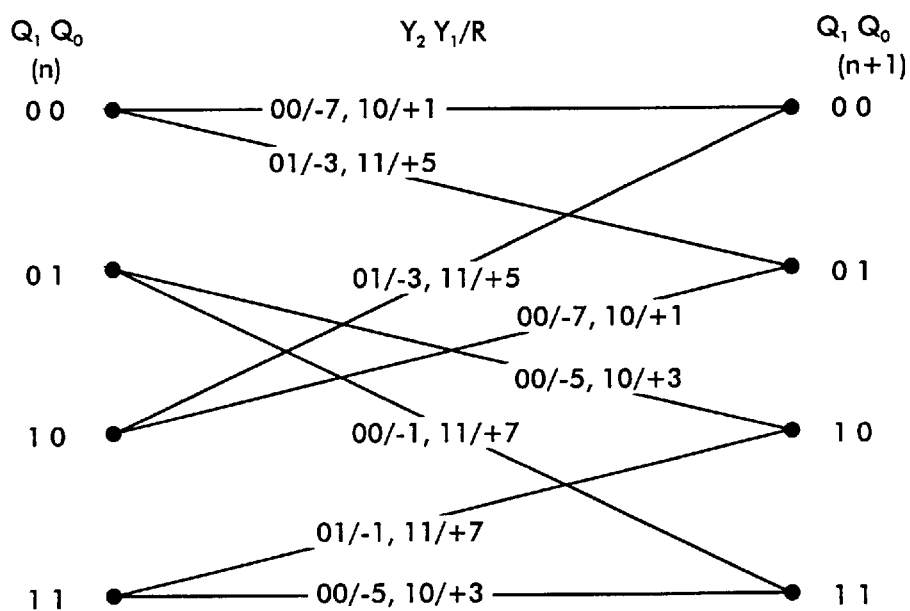
FIG. 24 is a table illustrating the operation of the convolutional encoder of FIG. 17 in additional detail.
FIG. 25 is a trellis state transition diagram based upon the table of FIG. 24.

FIG. 25 is a state transition diagram for the trellis encoder 154 of FIG. 17 derived from the state transition table of FIG. 24. The state transition diagram of FIG. 25 and the state transition table of FIG. 24 illustrate the four states of the trellis encoder and the various transitions therebetween. In particular, each state has two parallel branches, with each branch extending to the same or another state. The branches are labeled with the input bits $Y_2 \ Y_1$ causing the state transition and with the resulting output R of the symbol mapper 122. As will be explained in further detail hereinafter, this state diagram may be used to design an optimum maximum likelihood sequence estimation (MLSE) Viterbi decoder in the receiver for recovering estimations of the bits $Y_2$ and $Y_1$, as is well known in the art.

Figure 26:
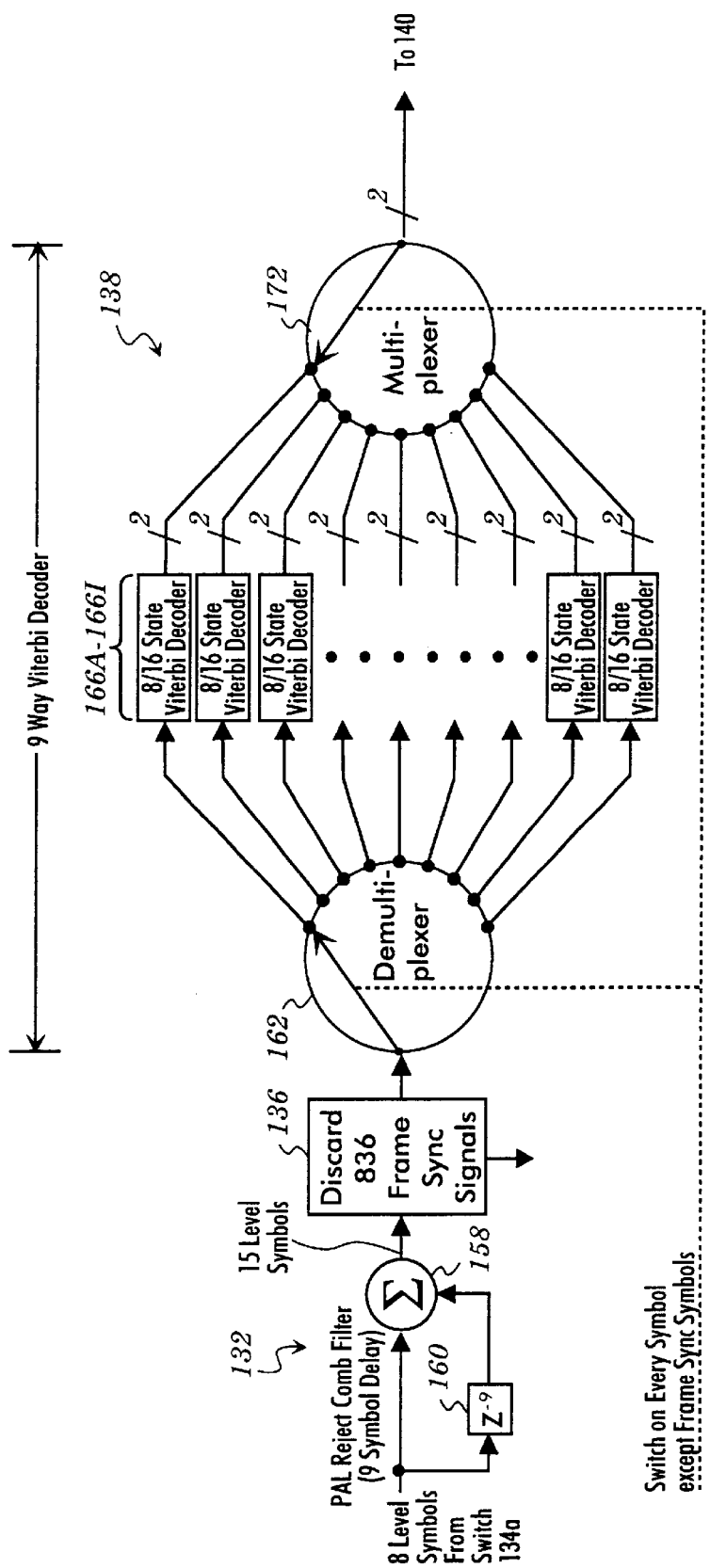
FIG. 26 illustrates the combination of the comb filter 132 and nine way Viterbi decoder 138 of FIG. 15b operating in a comb filter enabled mode.
Figure 27:
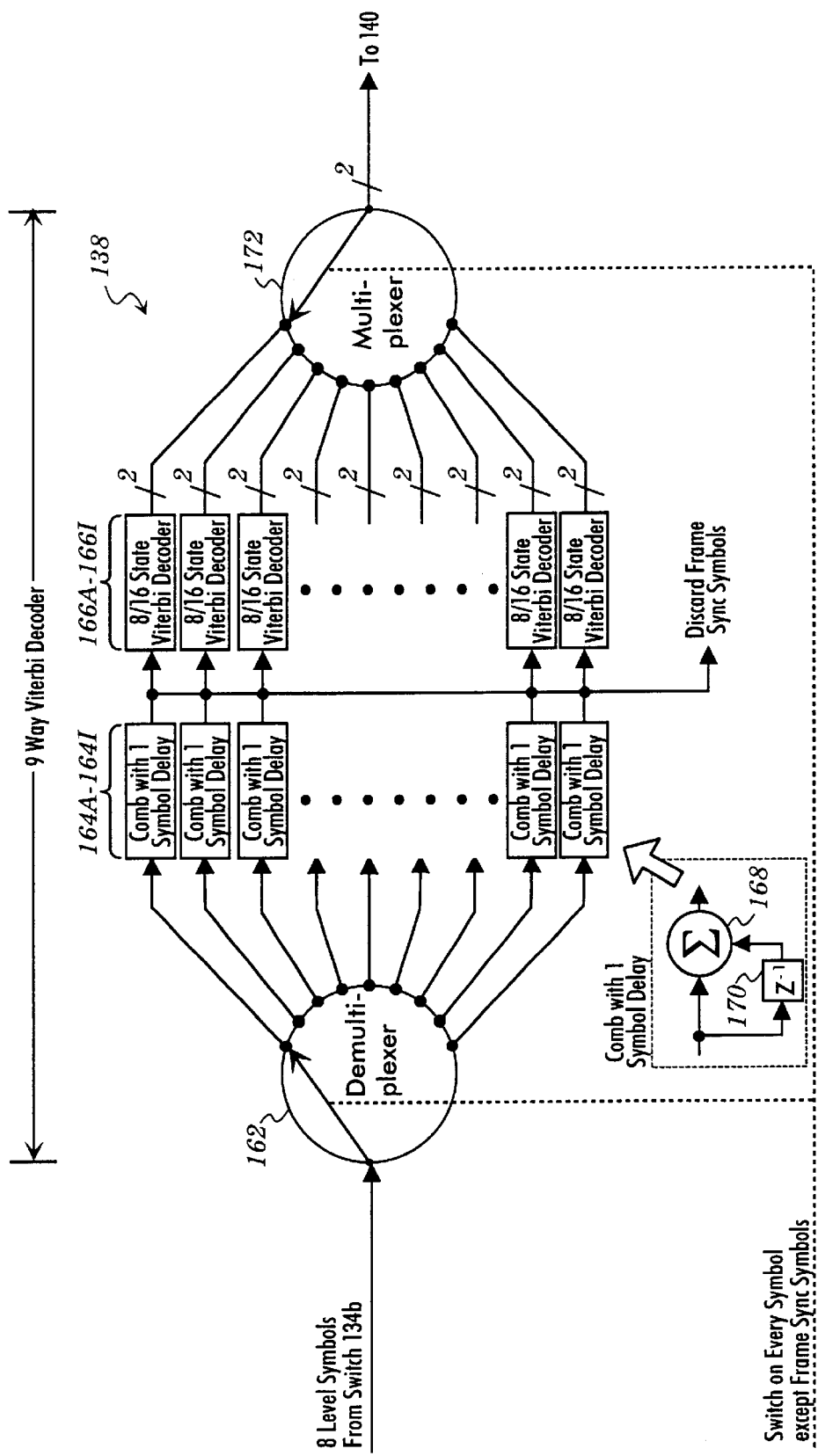
FIG. 27 is a useful equivalent circuit for the arrangement of FIG. 26.
Figure 28:
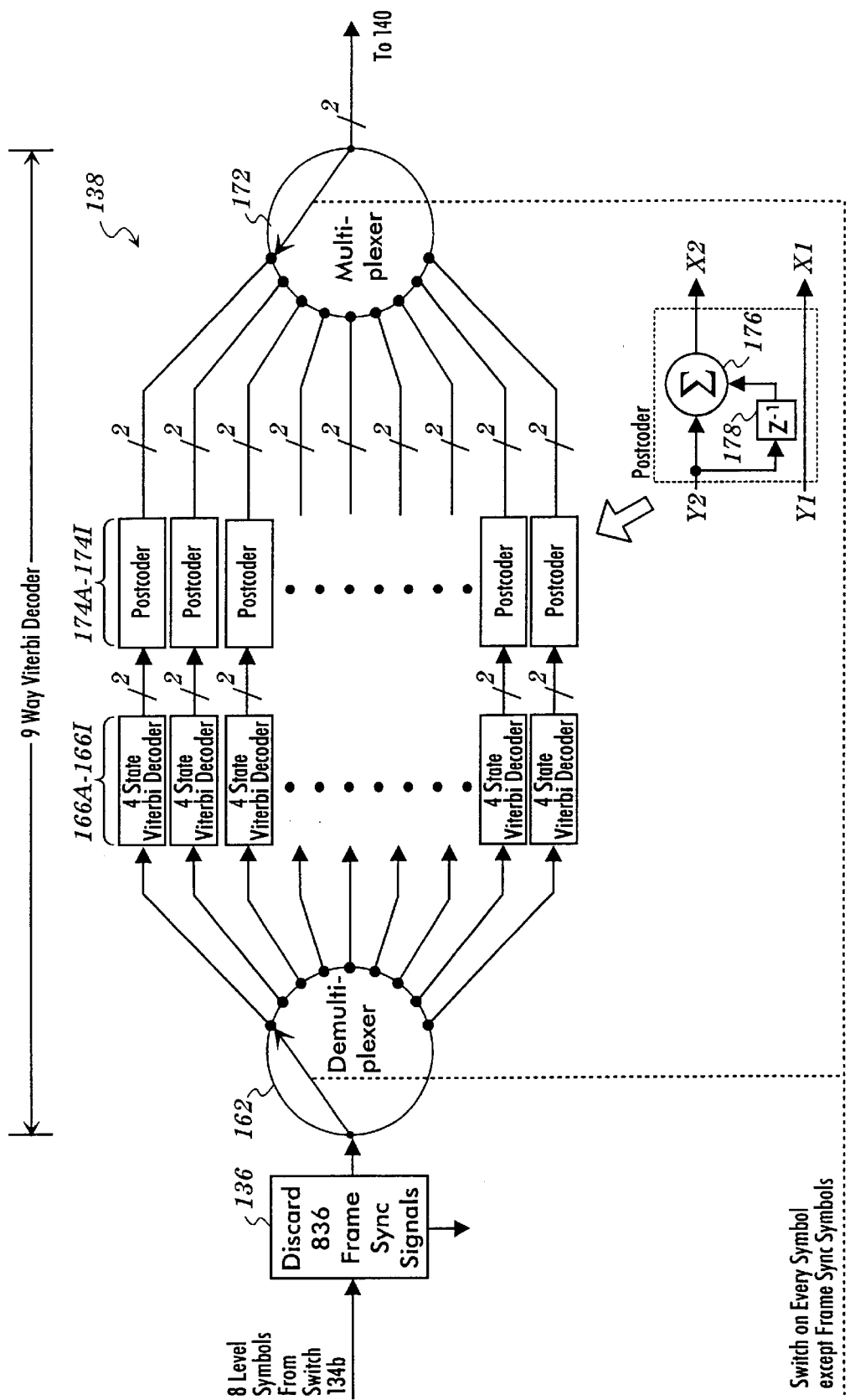
FIG. 28 illustrates the nine way Viterbi decoder 138 of FIG. 15b operating in a comb filter bypassed mode.

FIGS. 26, 27, and 28 illustrate the decoding aspects of the invention in more detail, with specific reference to the comb filter 132 and the nine way Viterbi decoder 138. As shown in FIG. 15b, the eight level TCM encoded symbol values from the tuner, demodulator, and A/D 128 are applied to the data acquisition unit 130 which provides various synchronization signals and clocks to other portions of the receiver, as needed. The output of the data acquisition unit 130 is coupled to the selector switch 134a/134b which either feeds or bypasses the comb filter 132. As disclosed in U.S. Pat. No. 5,260,793, the comb filter 132 may be switched into or out of the signal path (by the comb filter control signal in FIG. 15b) in response to the presence of an interfering signal.

The comb filter 132, as shown in FIG. 26, is a feedforward filter including a linear summer 158 and a nine symbol delay element 160. The comb filter 132 converts the eight level symbols to fifteen level symbols. The comb filter 132 is operable to reduce PAL co-channel interference by adding, to each received symbol, the received symbol which occurs nine symbol intervals earlier. (See U.S. Pat. No. 5,087,975 for a fuller explanation of comb filtering.)

The output of the selector switch 134a/134b (the selector switch 134a/134b of FIG. 15b is omitted from FIGS. 26, 27, and 28 for convenience) is coupled to the frame sync symbol discard unit 136 which intercepts and discards the 836 symbols of every frame sync segment. The remaining TCM encoded priming symbols, segment sync symbols, and data symbols are fed to the nine way Viterbi decoder 138.

U.S. Pat. No. 5,600,677 discloses that an N way TCM encoded symbol stream may be decoded by an N way Viterbi decoder, such as the nine way Viterbi decoder 138 in the receiver of FIG. 15b. An N way Viterbi decoder is shown in FIGS. 26, 27, and 28, where N=9. It is further disclosed in this patent that Viterbi decoders in receivers may have two modes of operation controlled by the comb filter control signal, one mode for the first processing path with the comb filter 132 (FIGS. 26 and 27), and one mode where the comb filter 132 is bypassed (FIG. 28).

The combination of the comb filter 132 and the nine way Viterbi decoder 138 can be illustrated by the two equivalent circuits of FIGS. 26 and 27. Because of the nine symbol delay 160, the effect of the comb filter 132, which is located upstream of an input commutator 162 (i.e., demultiplexer) shown in FIG. 26, is equivalent to the nine comb filters 164A–164I which are located downstream of the input commutator 162 and which are shown in FIG. 27, where each of the comb filters 164A–164I has a summer 168 and a one symbol delay 170. Each of the comb filters 164A–164I feeds a corresponding one of nine Viterbi decoders 166A–166I. The equivalence of the circuits shown in FIGS. 26 and 27 is clear from the fact that, in both cases, symbols that are nine symbol intervals apart in the symbol stream are combined by the linear summers (158 or 168) in the comb filters (42 or 164A–164I). It should be understood that, while FIG. 26 represents a more likely hardware implementation, the equivalent circuit of FIG. 27 better illustrates the effect of the comb filter on Viterbi is decoding.

As shown in FIG. 28, if the comb filter 132 is bypassed, then each of the Viterbi decoders 166A–166I within the nine way Viterbi decoder 138 is a four state optimal MLSE decoder whose output feeds a corresponding one of postcoders 174A–174I (which are discussed later). As shown in FIG. 27, if the comb filter 132 is switched in, each of the Viterbi decoders 166A–166I within the nine way Viterbi decoder 138 may be either a sixteen state optimal MLSE decoder whose output feeds a corresponding one of the postcoders 174A–174I (for convenience, the postcoders 174A–174I are not explicitly shown in FIG. 27) or an eight state suboptimal decoder with no postcoders. The increase in states from four to eight or sixteen states for each Viterbi decoder, as will be explained, is due to the effect of the comb filter 132.

The 836 frame sync symbols are intercepted and discarded in the frame sync symbol discard unit 136 and are not applied to the nine way Viterbi decoder 138. The remaining priming symbols, segment sync symbols, and data symbols are each applied to a respective one of the Viterbi decoders 166A–166I. It will be seen that most of the original data bytes from the data source 110 are processed as a unit by a respective one of the Viterbi decoders 166A–166I. For example, the data byte represented by the symbols $[0_0 0_1 0_{2O3}]$ are processed by the Viterbi decoder 166E (see FIG. 23). "Byte packing" in the receiver will match the byte packing in the transmitter shown in FIG. 23.

Consider first the case where the comb filter 132 is bypassed as shown in FIG. 28. Each of the optimal MLSE Viterbi decoders 166A–166I of FIG. 28 may comprise a substantially identical device operating at the rate of fs/9 (where fs is the symbol clock) and programmed according to the state diagram of FIG. 24 for effecting optimum MLSE Viterbi decoding in order to recover estimations of the bits $Y_2$ and $Y_1$ as is well known in the art. In particular, each of the optimal MLSE Viterbi decoders 166A–166I is programmed to generate four branch metrics, typically using an appropriately programmed ROM, each representing the difference between the received symbol level (e.g., an 8–10 bit digital value) and the closest one of the two subset levels of each of the symbol subsets a, b, c, and d.

Figure 29:
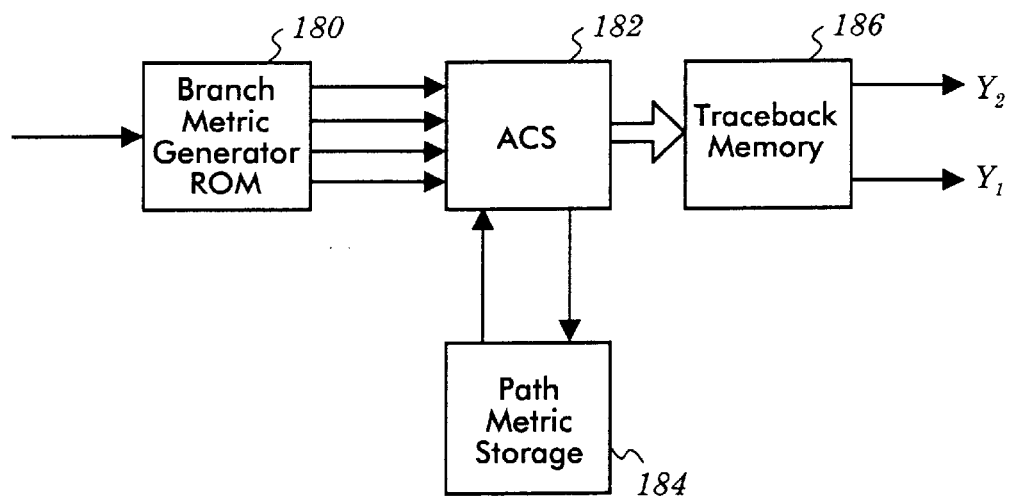
FIG. 29 is a functional block diagram of the optimal MLSE Viterbi decoders 166A–166I of FIG. 28 shown in additional detail.

In this case, FIG. 29 illustrates a Viterbi decoder manufactured by LSI Logic Corp. which may be programmed to perform the functions of each of the optimal MLSE Viterbi decoders 166A–166I of FIG. 28. The decoder shown in FIG. 29 comprises a branch metric generator ROM 180 which, in response to the received symbols, generates and applies four branch metrics to an add, compare and select (ACS) unit 182. The ACS unit 182 is bidirectionally coupled to a path metric storage memory 184 and also supplies a traceback memory 186. In general, the ACS unit 182 adds the branch metrics generated by the branch metric generator ROM 180 to the previous path metrics stored in the path metric storage memory 184 in order to generate new path metrics. The ACS unit 182 then compares the path metrics emanating from the same states, and selects the ones with the lowest path metrics for storage. The traceback memory 186, after a number of branches have been developed, is operable for selecting a surviving path and generating estimations of the bits $Y_2$ and $Y_1$ that would have produced the surviving path.

It will be recalled that, in the foregoing analysis, the effect of the precoder 152 on the input bit stream had been ignored. While the function of the precoder 152 will be described in further detail hereinafter, suffice it for now to recognize that the input bit $X_2$ differs from the bit $Y_2$ due to the operation of the precoder 152, which performs a modulo-2 operation. The output of each of the optimal MLSE Viterbi decoders 166A–166I shown in FIG. 28 comprises only an estimation of the bit $Y_2$, not the input bit $X_2$. Consequently, complementary modulo-2 postcoders 174A–174I are used in the receiver in order to recover estimations of the input bits $X_1$ and $X_2$ from the optimal MLSE Viterbi decoders 166A–166I, respectively.

Each of the postcoders 174A–174L comprises a direct path between the input bit $Y_1$ and the output bit $X_1$ and a feedforward circuit in which the output bit $Y_2$ is applied directly to one input of a modulo-2 adder 176 and to a second input of the modulo-2 adder 176 by way of a one-symbol delay element 178. The output of the modulo-2 adder 176 comprises an estimation of the input bit $X_2$. Finally, the decoded bits $X_1$, $X_2$ from the postcoders 174A–174I are multiplexed into an interleaved bit stream as shown in FIG. 28 by an output commutator 172.

Figure 30:
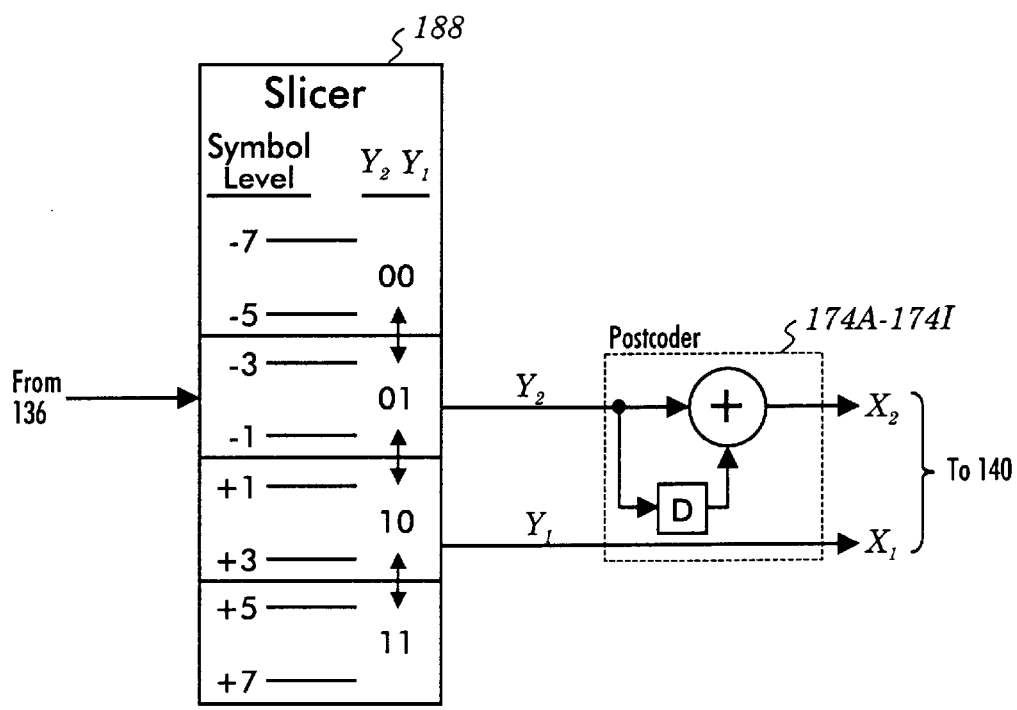
FIG. 30 is a diagram showing a circuit which may be used in place of the optimal MLSE Viterbi decoder of FIG. 29 for recovering estimations of bits $Y_1$ and $Y_2$.

In an alternate embodiment of the invention, each of the optimal MLSE Viterbi decoders 166A–166I of FIG. 28 may be replaced by a slicer 188, illustrated in FIG. 30, in order to provide a cost reduced receiver in cases where the received signal is characterized by a relatively high S/N ratio. This relatively high S/N ratio is frequently the case in cable transmissions which normally exhibit a better S/N ratio than terrestrial transmissions. A tradeoff is, therefore, made between TCM coding gain and receiver complexity and cost. As shown in FIG. 30, the slicer 188 is characterized by three slice levels (−4, 0 and +4). A received symbol having a level more negative than −4 will be decoded by the slicer 188 as bits $Y_2 Y_1=00$, a level between −4 and 0 as bits $Y_2 Y_1=01$, a level between 0 and +4 as bits $Y_2 Y_1=10$, and a level more positive than +4 as bits $Y_2 Y_1=11$.

As before, the bits $Y_2 Y_1$ are converted to an estimation of the bits $X_2 X_1$ by a respective one of the postcoders 174A–174I. As indicated by the mapping function shown in FIG. 19, it will be seen that the slicer 188 effects proper decoding of the received symbols because successive symbol levels are represented by common values of the bits $Z_2 Z_1$, as previously mentioned. This embodiment of the invention therefore, in effect, implements a four-level transmission and reception system which provides an equivalent bit rate as the 8-level TCM system, but with worse S/N performance because the TCM coding gain is not realized.

Now the case of Viterbi decoding for symbols passing thru the comb filter 132 will be discussed. Although the comb filter 132 has the desired effect of reducing NTSC co-channel interference, it also increases the complexity of the optimal MLSE Viterbi decoders 166A–166I (e.g., see FIG. 27) where optimum MLSE Viterbi decoding is used to recover the bits $X_1$ and $X_2$. In particular, an optimum MLSE Viterbi decoder must take into account not only the state of the encoder, but also the state of the one symbol delay 170 of the particular comb filter 164A–164I coupled to it. Because there are four encoder states and four possible ways to enter each state (i.e., there are four possible states of the one symbol delay 170 for each state of the trellis encoder 154 of FIG. 17), an optimum decoder must process a sixteen state trellis. In addition, the decoder must account for four branches entering each state, whereas only two branches enter each encoder state without the comb filter 132.

Figures 31, 32:
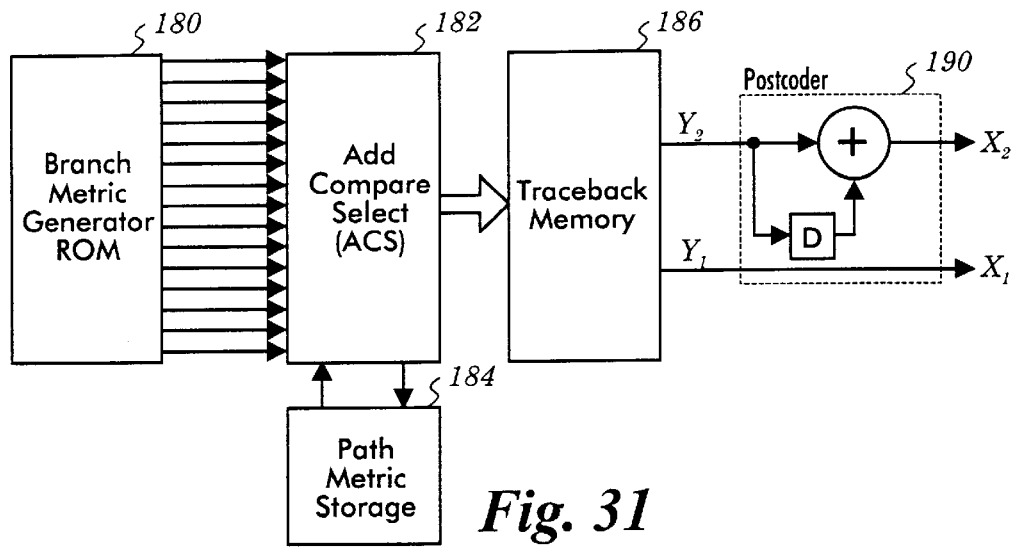
FIG. 31 is a functional block diagram of the optimal MLSE Viterbi decoders 166A–166I of FIGS. 26 and 27 shown in additional detail.
FIG. 32 is a table illustrating the operation of the TCM encoder of the invention including the effects introduced by the comb filter 132 of the receiver of FIG. 15b.

Such a sixteen state decoder is illustrated in FIG. 31 and, while complex in nature, its design is relatively straight forward. In particular, while the functionality of the decoder is similar to that shown in FIG. 29 (the same reference numerals are therefore used), its complexity is greatly increased because fifteen branch metrics must be generated instead of just four. The branch metrics represent the difference between a received symbol level and each of the possible fifteen constellation points at the output of the comb filter 132 (i.e., the linear combination of the eight-level symbols provides fifteen possible output levels).

The table of FIG. 32 illustrates a technique according to the invention for reducing the complexity, and thereby the cost, of the Viterbi decoders 166A–166I used to recover the bits $X_1$ and $X_2$ from the output of the comb filters 164A–164I. This simplification, which is made possible by preceding the bit $X_2$ as shown in FIG. 17 (with the precoder 152), is achieved by ignoring some of the state information from the one symbol delay 170 of the particular comb filter 164A–164I coupled to the Viterbi decoder in constructing the trellis diagram forming the basis of the decoder. In particular, as will be explained in further detail below, the decoding simplification is achieved according to this aspect of the invention by considering only the information identifying the subsets (see the mapping function in FIG. 19) a, b, c, and d of the eight possible states of the one symbol delay 170 of a particular comb filter 164A–164I. If the output of the one symbol delay 170 is represented by the reference letter V, the combined state of the encoder and the comb filter can be represented as $Q_1(n)Q_0(n)V_1V_0(n)$, where the subset $V_1 V_0 (n)$ equals the subset $Z_1 Z_0 (n-1)$. That is, the state of the one symbol delay 170 is represented by the subset of the previous symbol.

As shown in the table of FIG. 32, the first column represents the state of the combined encoder and comb filter (using only subset information to represent the state of the one symbol delay 170) $Q_1Q_0V_1V_0$ at time n. As shown, there are the following eight possible states: 0000, 0010, 0100, 0110, 1001, 1011, 1101, and 1111. In each of these states, $Q_1=V_0$. These eight states are derived from the last two columns of the table of FIG. 24 which gives the states $Q_1Q_0$ of the trellis encoder 154 and the associated $V_1V_0$ subset of the output V of the one symbol delay 170 of one of the comb filters 164A–164I (FIG. 27) at an arbitrary time (n+1). It will be noted that the $V_1V_0$ subset at time (n+1) is the same as the output bits $Z_1Z_0$ at time n (see the third column of the FIG. 24 table). Each state $Q_1Q_0V_1V_0$ of the combined encoder and comb filter is listed twice in the table of FIG. 32, once for each possible value of the input bit $X_1$ (see the third column of the table of FIG. 32). The fourth column of the table of FIG. 32 represents the subset $Z_1Z_0$ at time n for each encoder/channel state and for each value of the input bit $X_1$. These values are derived on the basis of the relationships $Z_1=X_1$ and $Z_0=Q_0$. Both the $V_1V_0$ subset in the first column of the table and the $Z_1Z_0$ subset in the fourth column of the table are identified by the subset identifiers (a–d) shown in the mapping function of FIG. 19 and in the second and fifth columns, respectively, of the table of FIG. 32.

The output of the linear summer 168 of each of the comb filters 164A–164I is applied to a corresponding one of the Viterbi decoders 166A–166I of FIG. 27. This output is identified in FIG. 32 by the letter U, and comprises the value of a received symbol plus the value of the previous symbol. The value of U is represented in the sixth column of the table of FIG. 32 as the sum of the Z subset $Z_1Z_0$ and the V subset $V_1V_0$ in terms of the subset identifiers (a–d). Thus, for example, the U subset sum at time n for the first row of the table is (d+d), for the second row (b+d), and so on.

Figure 33:
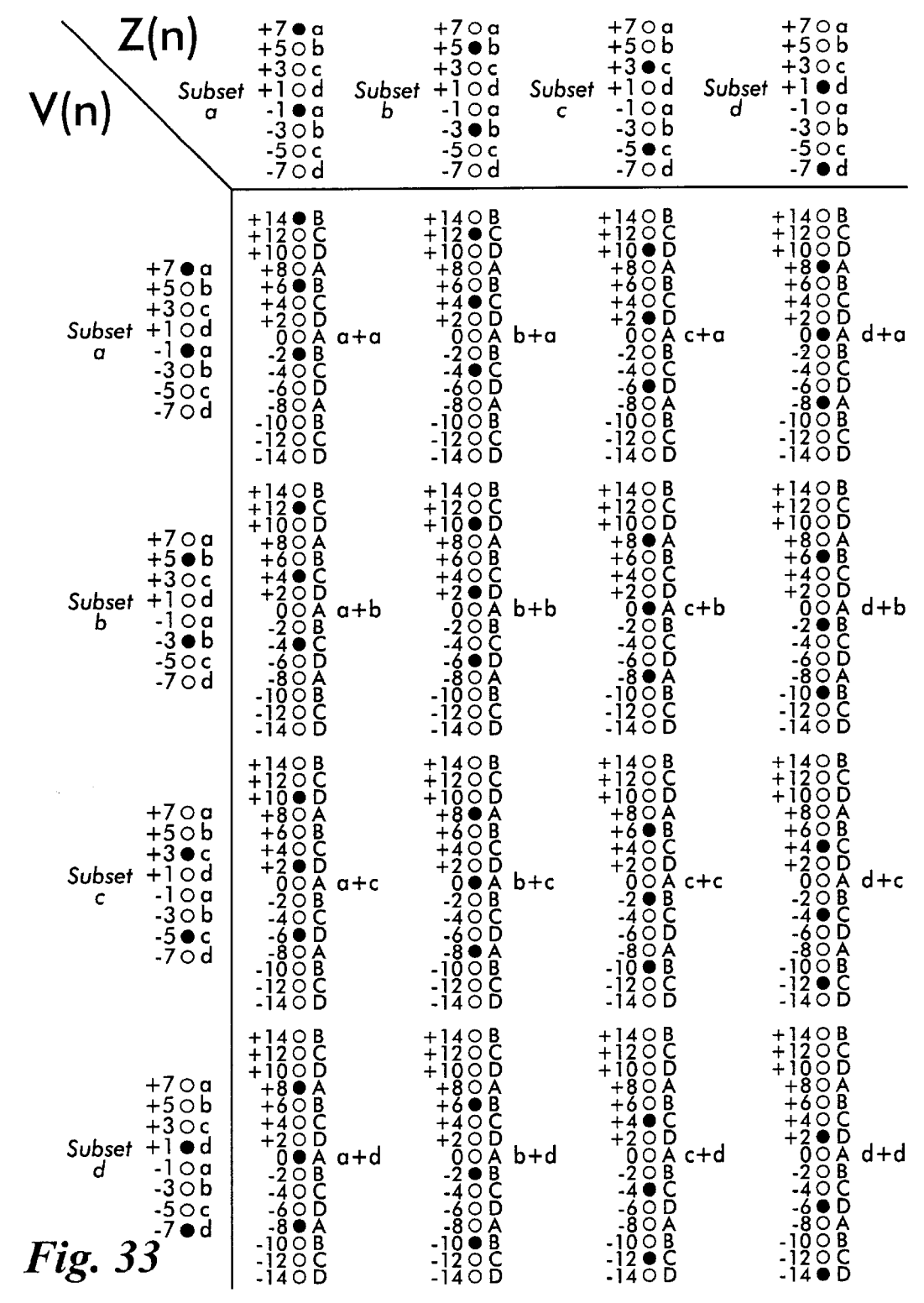

In FIG. 33, the possible values of the U subset sums are derived by adding each V subset (a, b, c and d) to each Z subset (a, b, c and d). In particular, each possible Z subset is identified along the top of FIG. 33 by the darkened circles corresponding to the levels of the respective subsets. For example, the subset a comprises the levels −1 and +7 of the eight levels, the subset b comprises the levels −3 and +5, and so on. Likewise, each possible V subset is identified along the left-hand margin of FIG. 33. The results of adding each V subset to each Z subset in order to derive the U subset sums (U=Z+V) are shown in the interior of FIG. 33. For example, the U subset sum (a+a) (see the last row of the table of FIG. 32) is derived by adding the a subset levels −1 and +7 of the Z subset to the a subset levels −1 and +7 of the V subset, which gives the three levels +14, +6, and −2 as shown in the upper left-hand corner of the interior of FIG. 33. Similarly, the U subset sum (a+b) (see the 8th and 12th rows of the FIG. 32 table) is derived by adding the b subset levels −3 and +5 of the Z subset to the a subset levels −1 and +7 of the V subset, which gives the three levels +12, +4, and −4 as shown, and so on. If a pilot is added to the transmitted signal, the amplitude levels of the sets shown in FIG. 33 (and the cosets shown in FIG. 34 discussed below) are no longer symmetrical about zero level because the pilot offsets the amplitude of each of the symbols by a predetermined amount.

Figures 34, 35:
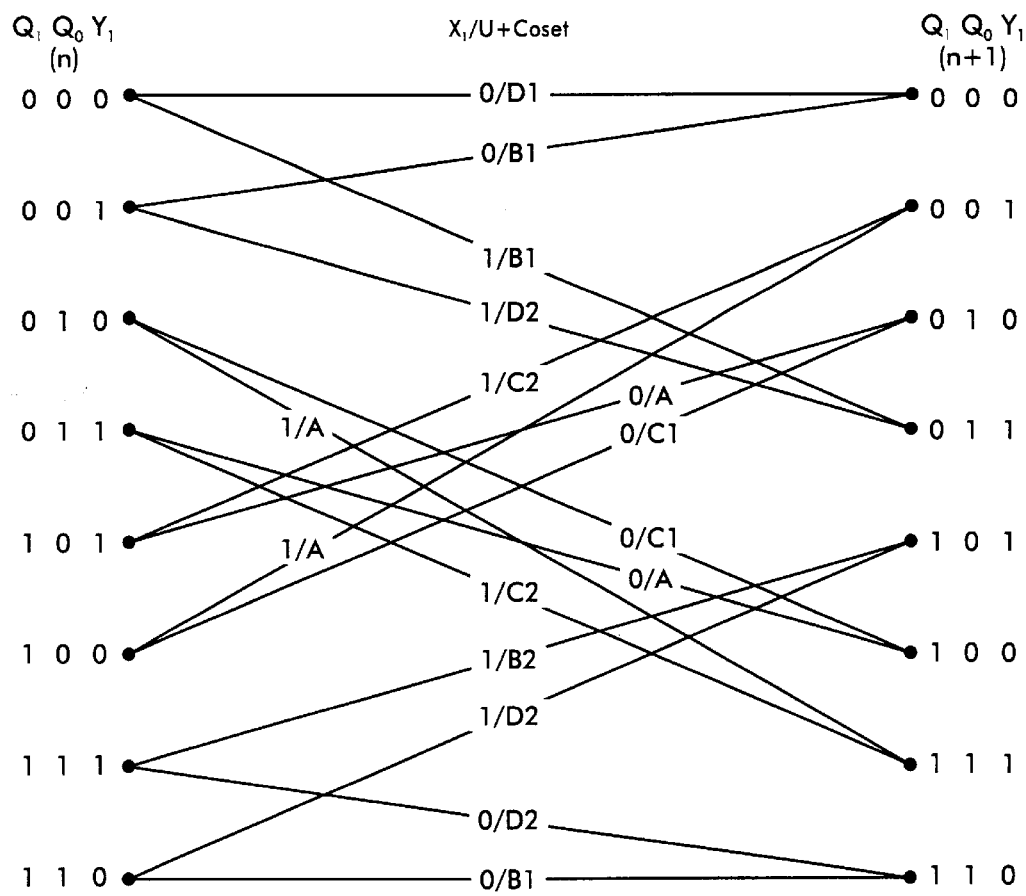
FIG. 34 shows the seven cosets that occur in the table of FIG. 33.
FIG. 35 is a trellis state transition diagram based on the table of FIG. 32.

Examination of the sixteen U subset sums shown in FIG. 33 reveals that each belong to one of seven common subset sums hereinafter referred to as cosets. These seven cosets are shown in FIG. 34 and are identified as cosets A (U subset sums b+c and a+d), B1 (U subset sums c+c and b+d), B2 (U subset sum a+a), C1 (U subset sum c+d), C2 (U subset sum a+b), D1 (U subset sum d+d), and D2 (U subset sums b+b and a+c). The coset for each U subset sum is also shown in the 7th column of the table of FIG. 32. It will be observed that each coset comprises three of fifteen possible levels.

The final column of the table of FIG. 32, which corresponds to the last two columns of the table of FIG. 25, represents the state $Q_1 Q_0 V_1 V_0$ of the encoder/comb filter at time (n+1). The first and last columns of this table can now be used to construct a trellis state transition diagram for the combined encoder/comb filter. This trellis state transition diagram is shown in FIG. 35 and is derived from FIG. 32. In FIG. 35, $V_0$ has been disregarded since it is redundant with $Q_1$. The trellis state transition diagram thus comprises eight states at time n, with two branches emanating from each state. Each branch is labeled with the input bit $X_1$ and the U coset A, B1, B2, C1, C2, D1 and D2 associated with the respective transition. The trellis diagram of FIG. 35 can now be used to provide the basis of a reduced complexity Viterbi decoder (for each of the Viterbi decoders 166A–166I) in order to estimate the input bit $X_1$ from the output U of the linear summer 168 of the one symbol delay equivalent comb filter 164A–164I.

Figure 36:
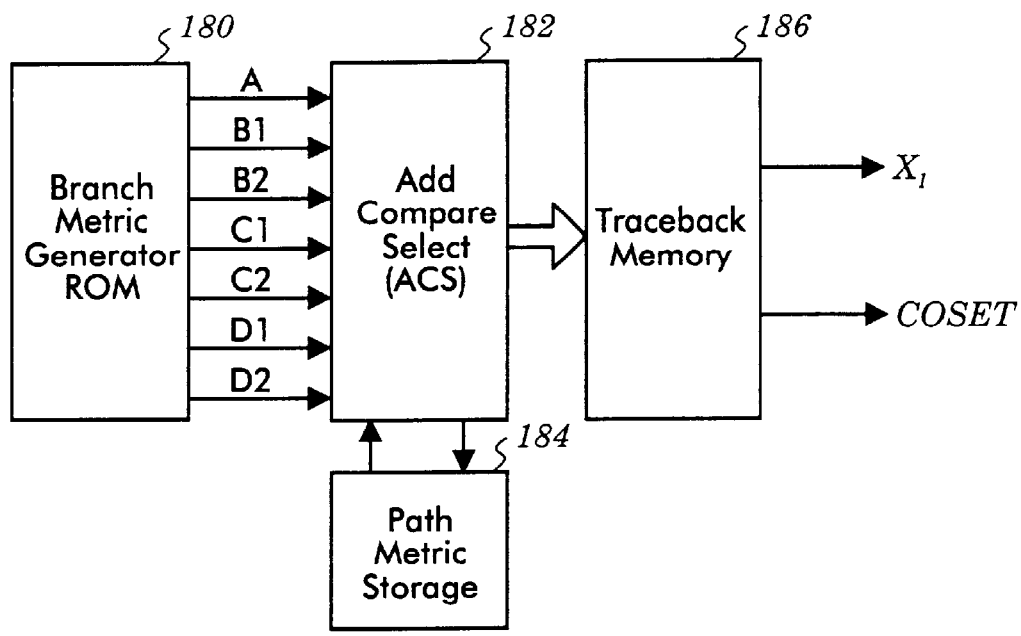
FIG. 36 is a functional block diagram of a Viterbi decoder programmed on the basis of the trellis diagram of FIG. 35.

This decoder, which comprises an alternate embodiment of the optimum Viterbi decoder of FIG. 31, may take the form of the Viterbi decoder illustrated in FIG. 36. The apparatus used to implement this Viterbi decoder may be similar to that used in the decoder of FIGS. 29 and 31 and thus comprises the branch metric generator ROM 180, the ACS unit 182, the path metric storage memory 184, and the traceback memory 186.

In the case of the decoder of FIG. 36, the branch metric generator ROM 180 is programmed to generate seven branch metrics each representing the squared Euclidean distance between the symbol level U at the output of the linear summer 168 of one of the comb filters 164A–164I and the nearest one of the three valid levels of each of the seven cosets A, B1, B2, C1, C2, D1 and D2. For example, assuming a level U=(−6), the seven branch metrics would be derived as follows: $A=2^2=4$; $B1=4^2=16$; $B2=4^2=16$; $C1=2^2=4$; $C2=2^2=4$; D1=0; and, D2=0. Based on these branch metrics and the trellis diagram of FIG. 35, the decoder provides an estimation of the bit $X_1$ and the associated COSET identification, which are known from the surviving path decisions made by the decoder.

It is still, however, necessary to provide an estimation of the input bit $X_2$. This estimation may be made in response to the COSET information provided by the Viterbi decoder of FIG. 36. The ability to so estimate the bit $X_2$ is facilitated by providing the precoder 152 in the path of the input bit $X_2$ as shown in FIG. 17. In particular, it will be seen that the precoder 152 is configured such that, whenever the input bit $X_2(n)=1$, the corresponding output bit $Y_2(n)$ of the precoder is different from the previous output bit $Y_2(n-1)$. That is, if $Y_2(n) \ne Y_2(n-1)$, then $X_2(n)=1$. Also, if $X_2(n)=0$, then the corresponding output bit $Y_2(n)$ will be equal to the previous output bit $Y_2(n-1)$. That is, if $Y_2(n)=Y_2(n-1)$, then $X_2(n)=0$. Moreover, with reference to the mapping function of FIG. 19, it will be observed that a positive level symbol is provided when $Z_2$ (i.e., $Y_2$)=1 and a negative level symbol is provided when $Z_2 Y_2=0$.

Figure 37:
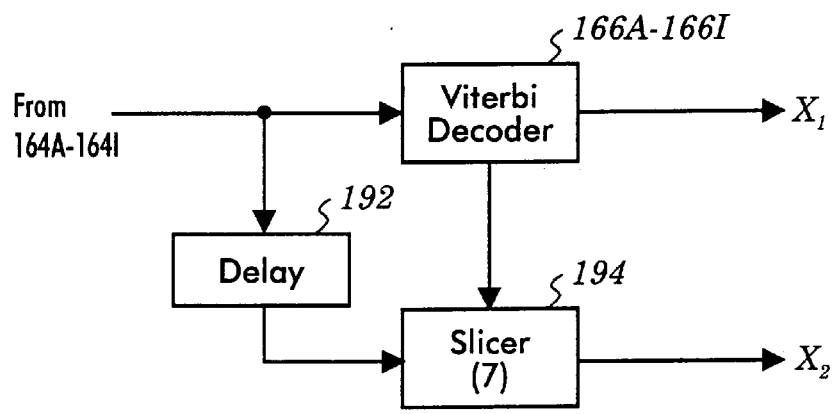
FIG. 37 is a block diagram illustrating the use of the Viterbi decoder of FIG. 36 to recover estimations of transmitted bits $X_1$ and $X_2$.

The foregoing characteristics are used to estimate the bit $X_2$ as shown in FIG. 37. The symbol level U at the output of the linear summers 168 of the comb filters 164A–164I is applied through a delay 192 (chosen to match the delay of the Viterbi decoders 166A–166I) to one input of a plurality (i.e., seven) of slicers 194. The COSET identification signal at the output of the Viterbi decoder 166A–166I is applied to the second input of the slicers 194. An estimation of the bit $X_2$ is developed by the slicers 194 by determining whether the U symbol level from the comb filters 164A–164I is closer to one of the outer levels (e.g., levels +8 or −8 of the coset A) of the coset A, B1, B2, C1, C2, D1 or D2 identified by the COSET identification signal from the respective Viterbi decoder 166A–166I, in which case the bit $X_2$ is decoded as a 1, or whether the U symbol level from the comb filters 164A–164I is closer to the intermediate level (e.g., level 0 of coset A) of the identified coset, in which case the bit $X_2$ is decoded as a 0. The foregoing description is based on the fact that the positive outer level of each of the cosets (e.g., +8 of coset A) results only when successive $Y_2$ bits at the output of the precoder 152 are characterized by the values $Y_2(n)=1$ and $Y_2(n-1)=0$, the negative outer level of each coset (e.g., −8 of coset A) results only when successive $Y_2$ bits have the values $Y_2(n)=0$ and $Y_2(n-1)=1$, and the intermediate level of each coset (e.g. 0 of coset A) results only when successive $Y_2$ bits have values $Y_2(n)=1$ and $Y_2(n-1)=1$ or $Y_2(n)=0$ and $Y_2(n-1)=0$. In these latter two cases, $X_2(n)=0$ (since $Y_2(n)=Y_2(n-1)$).

Finally, it will be understood that the inclusion of the precoder 152 (FIG. 17) in the path of the input bit $X_2$ requires the incorporation of a complementary postcoder 190 (FIG. 31) in the path of the estimated bit $X_2$ when a Viterbi decoder is used to process the output of the comb filter 132. A complementary postcoder is not required in the case of the circuit of FIG. 37 because the estimated bit $X_2$ is directly produced.

Figure 38:
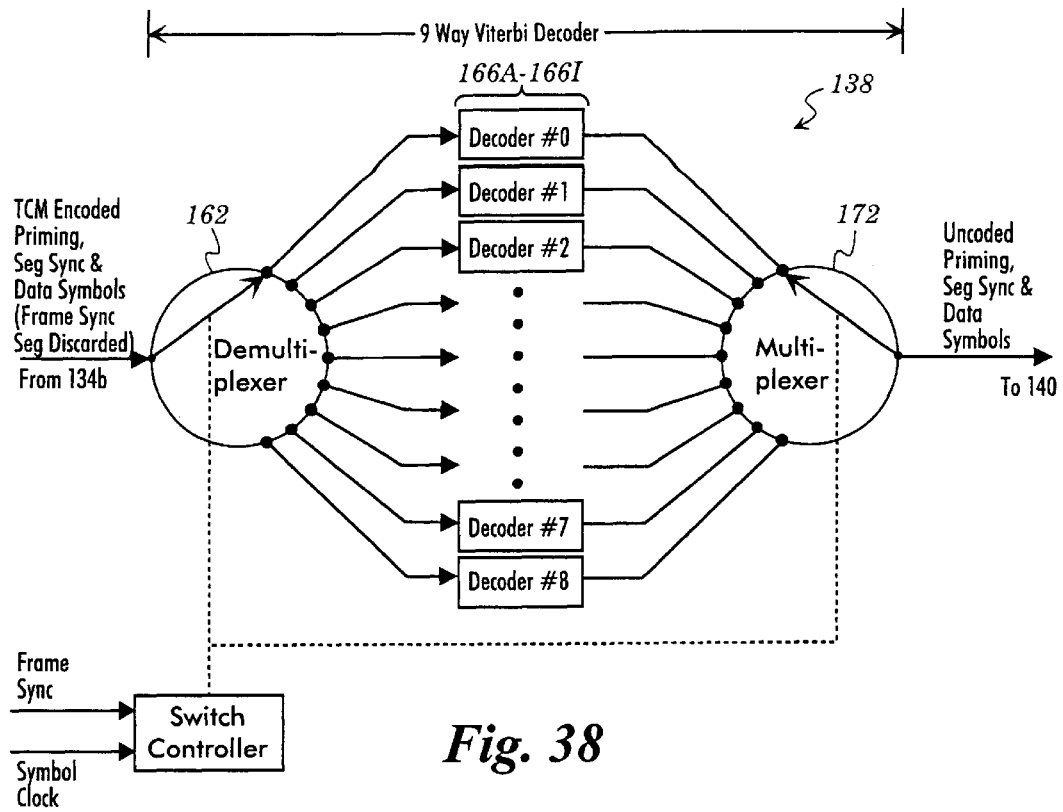
FIG. 38 is another illustration of the nine way Viterbi decoder 45 of FIG. 15b showing demultiplexer/multiplexer synchronization with frame sync; and, FIG. 39 shows the symbol deinterleaver 142 of FIG. 15b in additional detail.

Reference is made again to FIG. 15b and the nine way Viterbi decoder 138 now illustrated in FIG. 38 (which is similar to FIG. 12), where TCM encoded priming symbols, segment sync symbols, and data symbols are decoded. The output of the nine way Viterbi decoder 138 consists of uncoded priming symbols, segment sync symbols, and data symbols which are coupled to the priming symbol and segment sync symbol stripper 140. The priming symbol and segment sync symbol stripper 140 discards the uncoded priming symbols and segment sync symbols, passing only the uncoded data symbols to the symbol deinterleaver 142. The symbol deinterleaver 142 is a 9×4 block deinterleaver and is used to form the uncoded data symbols back into bytes. All operations are synchronized by the frame sync and the segment sync.

The timing for the nine way Viterbi decoder 138 of FIG. 38 was discussed in Part I with reference to FIG. 12. The symbol ordering into and out of the decoder 138 does not change. Accordingly, the decoder 138 outputs uncoded symbols in the following order:

$$\ldots S_0 S_1 S_2 S_3 S_4 S_5 S_6 S_7 S_8 0_1 1_2 3_1 \ldots$$
$$206_2 198_3 199_3 200_3 201_3 P_0 P_1 P_2 P_3 202_3 203_3 204_3 205_3 206_3 \ldots$$

After removal of the uncoded priming symbols and the uncoded segment sync symbols by the priming symbol and segment sync symbol stripper 140 (which was discussed in Part I with reference to the priming and segment synchronization symbol stripper 92 of FIG. 11), the ordering is as follows:

$$\ldots 0_0 1_0 2_0 3_0 4_0 5_0 6_0 7_0 8_0 0_1 1_1 2_1 3_1 \ldots 7_3 8_3 9_0 10_0 \ldots 17_0 9_1 10_1 \ldots$$
$$206_2 198_3 199_3 200_3 201_3 202_3 203_3 204_3 205_3 206_3 \ldots$$

Figure 39:
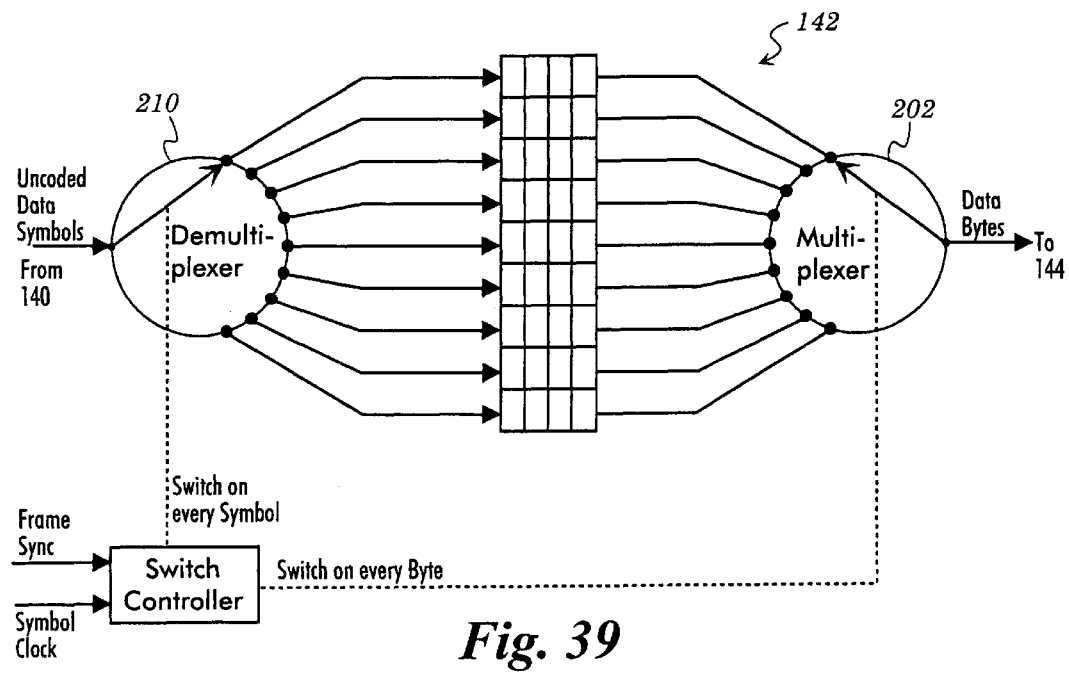

The symbol deinterleaver 142 is shown in FIG. 39, which includes an input commutator 200 and an output commutator 202. The operation of the symbol deinterleaver 142 was discussed in Part I with reference to the symbol deinterleaver 94 of FIG. 13. The symbol ordering out of the symbol deinterleaver 142 is as follows:

$$[0_0 0_1 0_2 0_3] [1_0 1_1 1_2 1_3] [2_0 2_1 2_2 2_3] \ldots [206_0 206_1 206_2 206_3]$$

Up to this point it has only been stated that the frame sync segment is inserted into the symbol stream by the frame formatter 124 in the transmitter of FIG. 15a and that the frame sync segment is discarded by the frame sync symbol discard unit 136 in the receiver of FIG. 15b. The processing of the frame sync segment in the transmitter and receiver will now be discussed. The structure of the frame sync segment disclosed here is very similar to that discussed in the ATSC Digital Television Standard and U.S. Pat. No. 5,619,269. The frame sync segment is used by the receiver to determine the starting position of the data frame and to determine the VSB mode (see U.S. Pat. No. 5,745,528 and the discussion in Part I above) of the transmission. The frame sync segment consists of 836 symbols inserted into the symbol stream by the frame formatter 34 prior to every group of 288 data segments. As shown above, the frame sync segment structure is:

$$[S_0 S_1 S_2 S_3][\text{ATSC PN sequences}][\text{VSB mode}][\text{unspecified symbols}][P_0 P_1 P_2 P_3 \text{ddddd}]$$

$[S_0 S_1 S_2 S_3]$ are four two-level symbols comprising the +5−5−5+5 segment sync waveform. The PN sequences are 700 two-level symbols comprising the same PN sequences as in the ATSC Digital Television Standard. The VSB mode coding comprises 24 two-level symbols and has been described in Part I. The next 99 symbols are two-level unspecified symbols. The last nine symbols of the frame sync segment are eight-level symbols, $[P_0 P_1 P_2 P_3 \text{ddddd}]$, which are repeats of the last nine TCM coded symbols of the data segment preceding the frame sync segment. There is no TCM or Reed-Solomon coding of frame sync symbols. It should be noted that the last nine frame sync symbols (repeat symbols) were already TCM coded during the previous segment.

As shown in FIG. 26, the comb filter 132 accepts all symbols as inputs. The output of the comb filter 132 is discarded by the frame sync symbol discard unit 136 during the 836 symbol frame sync segment, and the input commutator 162 and the output commutator 172 do not switch. Due to the repeat symbols at the end of the frame sync segment, the first nine symbols of the first data segment following the frame sync segment are effectively combined by the comb filter 132 with the last nine symbols of the last data segment of the previous frame. In this way the comb filter 132 behaves as if the frame sync segment were not present so that the comb filter 132 operates only on symbols that were TCM encoded. This operation is required for the above described comb/Viterbi combination decoding to work properly.

The present invention has been described above with regard to VSB digital television systems. However, it should be recognized that the present invention may be used in other systems such as QAM and QPSK systems. Accordingly, it will be appreciated that the invention is limited only as defined in the claims.

What is claimed is:

1. A trellis coded modulator comprising:
   a convolutional encoder, wherein the convolutional encoder convolutionally encodes uncoded priming symbols, uncoded segment sync symbols, and data symbols; and,
   a symbol mapper, wherein the symbol mapper maps the convolutionally encoded priming symbols, segment sync symbols, and data symbols into corresponding multi-value symbols, and wherein the uncoded priming symbols condition the convolutional encoder and the symbol mapper to output coded segment sync symbols having predetermined values.

2. The trellis coded modulator of claim 1 wherein the convolutional encoder convolutionally encodes a first input data bit $X_1$ to thereby derive first and second output bits $Z_0$ and $Z_1$, wherein the convolutional encoder includes a precoder, wherein the precoder precodes one or more second input data bits $X_2$–$X_N$ to thereby derive respective output bits $Z_2$–$Z_N$, wherein the symbol mapper maps the output bits $Z_0$, $Z_1$, $Z_2$–$Z_N$ into the corresponding multi-value symbols, wherein the output bits $Z_0$, $Z_1$ identify respective subsets of the symbols, wherein each of the subsets comprises two or more equally spaced symbol values, wherein the output bits $Z_2$–$Z_N$ select a symbol from the selected subset.

3. The trellis coded modulator of claim 2 wherein the precoder precodes only one second input data bit $X_2$ in order to derive the output bit $Z_2$, wherein the symbol mapper maps the output bits $Z_0$, $Z_1$, $Z_2$ into corresponding eight-value symbols, wherein each of the subsets comprises two equally spaced symbol values, and wherein the output bit $Z_2$ selects a symbol from the selected subset.

4. The trellis coded modulator of claim 3 wherein the eight-value symbols comprise symbols having eight distinct amplitude levels.

5. The trellis coded modulator of claim 2 wherein the multi-value symbols comprise symbols having a plurality of distinct amplitude levels.

6. The trellis coded modulator of claim 5 wherein the amplitude levels are symmetrical about zero level, and wherein a pilot offsets the amplitude of each of the symbols by a predetermined amount.

7. The trellis coded modulator of claim 2 including a data source that supplies the input data bits $X_1$, $X_2$–$X_N$ at a predetermined symbol rate, wherein the convolutional encoder is a nine way convolutional encoder consisting of nine precoders and nine convolutional encoders, and wherein each of the precoders and each of the convolutional encoder includes at least one one symbol interval delay element, whereby the output bits $Z_0$, $Z_1$, $Z_2$–$Z_N$ are provided in the form of nine interleaved groups of separately coded bits.

8. The trellis coded modulator of claim 2 including a data source that supplies the input data bits $X_1$, $X_2$–$X_N$ at a predetermined symbol rate, wherein the precoder and the convolutional encoder each includes at least one nine symbol interval delay element, whereby the output bits $Z_0$, $Z_1$, $Z_2$–$Z_N$ are provided in the form of nine interleaved groups of separately coded bits.

9. The trellis coded modulator of claim 1 wherein the convolutional encoder consists of nine convolutional encoders each having at least one one symbol interval delay element.

10. The trellis coded modulator of claim 9 wherein each of the convolutional encoders convolutionally encodes a corresponding first input data bit $X_1$ to thereby derive corresponding first and second output bits $Z_0$ and $Z_1$, wherein each of the convolutional encoders includes a corresponding precoder, wherein each of the precoders precodes one or more corresponding second input data bits $X_2$–$X_N$ to thereby derive respective corresponding output bits $Z_2$–$Z_N$, and wherein the symbol mapper maps the output bits $Z_0$, $Z_1$, $Z_2$–$Z_N$ into the corresponding multi-value symbols.

11. The trellis coded modulator of claim 9 wherein each of the precoders includes a one symbol interval delay element.

12. The trellis coded modulator of claim 1 wherein the convolutional encoder includes at least one nine symbol interval delay element.

13. The trellis coded modulator of claim 12 wherein the convolutional encoder convolutionally encodes a first input data bit $X_1$ to thereby derive first and second output bits $Z_0$ and $Z_1$, wherein the convolutional encoder includes a precoder, wherein the precoder precodes one or more second input data bits $X_2$–$X_N$ to thereby derive respective output bits $Z_2$–$Z_N$, and wherein the symbol mapper maps the output bits $Z_0$, $Z_1$, $Z_2$–$Z_N$ into the corresponding multi-value symbols.

14. The trellis coded modulator of claim 12 wherein the precoder includes one nine symbol interval delay element.

15. The trellis coded modulator of claim 1 wherein the convolutional encoder convolutionally encodes a first input data bit $X_1$ to thereby derive first and second output bits $Z_0$ and $Z_1$, wherein the convolutional encoder includes a precoder, wherein the precoder precodes a second input data bit $X_2$ in order to derive a third output bit $Z_2$, and wherein the symbol mapper maps the output bits $Z_0$, $Z_1$, $Z_2$ into corresponding eight-value symbols.

16. The trellis coded modulator of claim 15 wherein the eight-value symbols comprise symbols having eight distinct amplitude levels.

17. The trellis coded modulator of claim 16 wherein the amplitude levels are symmetrical about zero level, and wherein a pilot offsets the amplitude of each of the symbols by a predetermined amount.

18. The trellis coded modulator of claim 1 further comprising a priming symbol inserter, wherein the priming symbol inserter supplies the priming symbols to the convolutional encoder.

19. The trellis coded modulator of claim 18 wherein the priming symbol inserter determines the state of the convolutional encoder in order to supply the correct priming symbols to the convolutional encoder.

20. The trellis coded modulator of claim 18 wherein the priming symbol inserter inserts P adjacent priming symbols, and wherein each of the P adjacent priming symbols precedes a corresponding one of S segment sync symbols by nine symbols.

21. The trellis coded modulator of claim 20 wherein P=S=4.

22. The trellis coded modulator of claim 18 wherein the priming symbol inserter inserts four adjacent priming symbols so that only five data symbols occur between the four priming symbols and the closest succeeding segment sync symbols.

23. The trellis coded modulator of claim 22 wherein the priming symbol inserter determines the state of the convolutional encoder in order to supply the correct priming symbols to the convolutional encoder.

24. The trellis coded modulator of claim 18 wherein the convolutional encoder convolutionally encodes a first input data bit $X_1$ to thereby derive first and second output bits $Z_0$ and $Z_1$, wherein the convolutional encoder includes a precoder, wherein the precoder precodes one or more second input data bits $X_2$–$X_N$ to thereby derive respective output bits $Z_2$–$Z_N$, and wherein the symbol mapper maps the output bits $Z_0$, $Z_1$, $Z_2$–$Z_N$ into the corresponding multi-value symbols.

25. The trellis coded modulator of claim 24 wherein the precoder precodes only one second input data bit $X_2$ in order to derive the output bit $Z_2$, and wherein the symbol mapper maps the output bits $Z_0$, $Z_1$, $Z_2$ into corresponding eight-value symbols.

26. The trellis coded modulator of claim 25 wherein the amplitude levels are symmetrical about zero level, and wherein a pilot offsets the amplitude of each of the symbols by a predetermined amount.

27. The trellis coded modulator of claim 24 wherein the precoder includes nine precoders, wherein the convolutional encoder includes nine convolutional encoders, wherein each of the convolutional encoders corresponds to one of the precoders, and wherein each of the precoders and each of the convolutional encoders include at least one one symbol interval delay element.

28. The trellis coded modulator of claim 24 wherein the precoder and the convolutional encoder each include at least one nine symbol interval delay elements.

29. The trellis coded modulator of claim 1 further comprising a frame formatter that formats the convolutionally encoded priming symbols, segment sync symbols, and data symbols into a frame having a plurality of data segments, wherein each data segment includes S segment sync symbols, P priming symbols, and D data symbols.

30. The trellis coded modulator of claim 29 wherein S=P=4, and wherein only five of the D data symbols separate the P priming symbols of one data segment from the S segment sync symbols of the next subsequent data segment.

31. The trellis coded modulator of claim 29 further comprising a priming symbol inserter, wherein the priming symbol inserter supplies the priming symbols to the convolutional encoder.

32. The trellis coded modulator of claim 31 wherein the priming symbol inserter inserts four adjacent priming symbols, and wherein each of the four adjacent priming symbols precedes a corresponding segment sync symbol by nine symbols.

33. The trellis coded modulator of claim 31 wherein the priming symbol inserter determines the state of the convolutional encoder in order to supply the correct priming symbols to the convolutional encoder.

34. The trellis coded modulator of claim 33 wherein the priming symbol inserter inserts four adjacent priming symbols, and wherein each of the four adjacent priming symbols precedes a corresponding segment sync symbol by nine symbols.

35. The trellis coded modulator of claim 34 wherein the convolutional encoder convolutionally encodes a first input data bit $X_1$ to thereby derive first and second output bits $Z_0$ and $Z_1$, wherein the convolutional encoder includes a precoder, wherein the precoder precodes a second input data bit $X_2$ in order to derive the output bit $Z_2$, and wherein the symbol mapper maps the output bits $Z_0$, $Z_1$, $Z_2$ into corresponding eight-value symbols.

36. The trellis coded modulator of claim 35 wherein the amplitude levels are symmetrical about zero level, and wherein a pilot offsets the amplitude of each of the symbols by a predetermined amount.

37. The trellis coded modulator of claim 1 wherein the convolutional encoder comprises a four-state, rate one-half, feedback, systematic convolutional encoder.

38. The trellis coded modulator of claim 1 wherein the convolutional encoder convolutionally encodes a first input data bit $X_1$ to thereby derive first and second output bits $Z_0$ and $Z_1$, wherein the convolutional encoder includes a precoder, wherein the precoder precodes one or more second input data bits $X_2$–$X_N$ to thereby derive respective output bits $Z_2$–$Z_N$, and wherein the symbol mapper maps the output bits $Z_0$, $Z_1$, $Z_2$–$Z_N$ into the corresponding multi-value symbols.

39. The trellis coded modulator of claim 38 wherein the precoder precodes only one second input data bit $X_2$ in order to derive the output bit $Z_2$, and wherein the symbol mapper maps the output bits $Z_0$, $Z_1$, $Z_2$ into corresponding eight-value symbols.

40. The trellis coded modulator of claim 39 wherein the amplitude levels are symmetrical about zero level, and wherein a pilot offsets the amplitude of each of the symbols by a predetermined amount.

* * * * *